US012593364B2

(12) United States Patent
Yi et al.

(10) Patent No.: US 12,593,364 B2
(45) Date of Patent: Mar. 31, 2026

(54) ENHANCED MULTI-ACCESS PROTOCOL DATA UNIT (PDU) SESSION

(71) Applicant: CABLE TELEVISION LABORATORIES, INC., Louisville, CO (US)

(72) Inventors: Yunjung Yi, Louisville, CO (US); Omkar Dharmadhikari, Lakewood, CO (US); Sundar R. Sriram, Aurora, IL (US)

(73) Assignee: Cable Television Laboratories, Inc., Louisville, CO (US)

( * ) Notice: Subject to any disclaimer, the term of this patent is extended or adjusted under 35 U.S.C. 154(b) by 388 days.

(21) Appl. No.: 17/943,620

(22) Filed: Sep. 13, 2022

(65) Prior Publication Data
US 2023/0078760 A1    Mar. 16, 2023

Related U.S. Application Data

(60) Provisional application No. 63/243,258, filed on Sep. 13, 2021.

(51) Int. Cl.
| | |
|---|---|
| *H04W 76/15* | (2018.01) |
| *H04W 60/00* | (2009.01) |
| *H04W 80/10* | (2009.01) |
| *H04W 88/06* | (2009.01) |

(52) U.S. Cl.
CPC ......... *H04W 76/15* (2018.02); *H04W 60/005* (2013.01); *H04W 80/10* (2013.01); *H04W 88/06* (2013.01)

(58) Field of Classification Search
CPC ... H04W 76/15; H04W 60/005; H04W 80/10; H04W 88/06
See application file for complete search history.

(56) References Cited

U.S. PATENT DOCUMENTS

| | | | | |
|---|---|---|---|---|
| 2017/0251368 A1* | 8/2017 | Ross | ....................... | H04W 4/60 |
| 2019/0306752 A1* | 10/2019 | Lai | .................... | H04W 28/0925 |
| 2021/0037585 A1* | 2/2021 | Youn | .................... | H04W 60/06 |
| 2022/0060970 A1* | 2/2022 | Zhu | ....................... | H04L 45/566 |
| 2022/0240222 A1* | 7/2022 | Youn | ................... | H04W 60/005 |
| 2022/0264370 A1* | 8/2022 | Qiao | ................... | H04L 12/1407 |
| 2022/0279384 A1* | 9/2022 | Sugawara | ............. | H04W 76/12 |

* cited by examiner

*Primary Examiner* — Michael Thier
*Assistant Examiner* — Tracy Lauren Raimondo
(74) *Attorney, Agent, or Firm* — Polsinelli PC

(57) ABSTRACT

Systems, methods, and devices include techniques for establishing an enhanced multi-access protocol data unit (PDU) session in a multi-network environment. Various registration procedures may be used to allocate resources between a first network (e.g., a Mobile Network Operator (MNO) and a second network (e.g., a Mobile Virtual Network Operator (MVNO). For instance, a method includes sending by a wireless device to a network, indication(s) related to network capabilities of the wireless device. The indication(s) include whether the wireless device supports a multi-access PDU session comprising a first PDU session and a second PDU session. The first PDU session is established via a 3rd Generation Partnership Project (3GPP) access the second PDU session is established via a first non-3GPP. The indication(s) include whether the wireless device supports an enhanced multi-access PDU session comprising a third PDU session, wherein the third PDU session is established via a second non-3GPP access.

20 Claims, 13 Drawing Sheets

ENHANCED MULTI-ACCESS PROTOCOL DATA UNIT (PDU) SESSION

CROSS-REFERENCE TO RELATED APPLICATION

This application claims priority under 35 U.S.C. § 119 to U.S. Provisional Patent Application No. 63/243,258, titled "ENHANCED MULTI-ACCESS PDU SESSION" and filed Sep. 13, 2021, the entirety of which is incorporated herein by reference.

BACKGROUND

A wireless device may be connected or equipped with two subscriber identification modules (SIM)s, which may be associated with one or more networks (e.g., Public Land Mobile Network (PLMN)s). Sometimes a first SIM is associated with a macro coverage network and a second SIM is associated with a micro coverage network. In these scenarios, a PDU session via the micro coverage network may lose coverage when the wireless device moves out of the coverage area of the micro coverage network. The wireless device may have to re-establish the PDU session via the macro coverage network after tearing down the PDU session via the micro coverage network. This may increase latency and cause service interruption during the re-establishment procedure.

It is with these observations in mind, among others, that the presently disclosed technology was conceived.

BRIEF SUMMARY

The aforementioned problems can be addressed using the systems, methods, and devices disclosed herein. For instance, a method can include sending by a wireless device to a network, one or more indications that: the wireless device supports a multi-access protocol data unit (PDU) session including a first PDU session and a second PDU session, the first PDU session is established via a 3rd Generation Partnership Project (3GPP) access the second PDU session is established via a first non-3GPP access; and/or the wireless device supports an enhanced multi-access PDU session comprising a third PDU session, wherein the third PDU session is established via a second non-3GPP access. The method can further include sending by the wireless device: a first PDU session request of the enhanced multi-access PDU session, to the network via the 3GPP access; and/or a second PDU session request of the enhanced multi-access PDU session, to the network, via the first non-3GPP access. Moreover, the method can include communicating with the network based on the enhanced multi-access PDU session.

In some examples, a method can include sending, by a wireless device, a first protocol data unit (PDU) session establishment request to a first network. The first PDU session establishment request can indicate a PDU session type being a multi-access PDU session across a plurality of access networks which includes a first access network and a second access network. The first PDU session establishment request can also indicate an anchor network being the first network; and/or a PDU session identifier. Additionally, the method can include receiving, via the first access network, a first response indicating a successful first establishment of a first PDU session, the first access network being a new radio access network; and/or sending, by the wireless device and based on receiving the first response, a second PDU session establishment request to a second network. The second PDU session establishment request can indicate the PDU session type; the anchor network being the first network; and/or the PDU session identifier. Furthermore, the method can include receiving, via the second access network a second response indicating a successful second session establishment of a second PDU session, the second access network being the new radio access network or a long-term evolution access network; and/or communicating with at least one of the first access network or the second access network based on the second PDU session.

In some examples, the first PDU session establishment request is received by a session management function (SMF) of the first network. Additionally or alternative, indicating the anchor network being the first network includes indicating a network access identifier associated with the first network. Moreover, indicating the anchor network being the first network can include indicating a public key infrastructure (PKI) associated with the first network. In some scenarios indicating the anchor network being the first network includes indicating a public land and mobile network (PLMN) identifier of the first network. Indicating the anchor network being the first network can also include indicating the PDU session identifier that is registered with a session management function (SMF) of the first network.

In some instances, the method further includes indicating the anchor network being the first network by indicating the PDU session type to the first network based on the first network being equipped with an access traffic steering, switching and splitting (ATSSS) of the multi-access PDU session across the plurality of access networks. Moreover, the method can further includes indicating the anchor network being the first network by indicating a single network slice selection assistance information (S-NSSAI) that supports the first PDU session across the plurality of access networks with the anchor network being the first network. By way of example, the first network can be a 5G core network and the second network can be a 5G core network or a 4G core network.

In some examples, the wireless device is equipped with a plurality of identity credentials corresponding to at least a first identity and a second identity. The first identity can be a first Subscriber Identity Module (SIM); and/or the second identity can be a second SIM. The method can further include the wireless device sending a second registration request via the second identity to the second network. Furthermore, the first PDU session establishment request can indicate whether the wireless device supports non-3GPP access. Additionally or alternatively the anchor network can include a session management function (SMF) or an S-Gateway and a user plane function (UPF).

In some instances, a method includes receiving, by a first SMF of a first network, a PDU session establishment request from a wireless device. The PDU session establishment request can indicate: a PDU session type being a multi-access PDU session across a plurality of access networks comprising a first access network of the first network and a second access network of a second network; an anchor network being the second network; and/or a PDU session identifier. In some examples, the method further includes determining a second SMF of the second network in response to the anchor network being the second network; and/or sending a forwarded request of the PDU session establishment request to the second SMF. The method can also include receiving a response of the forwarded request of the PDU session establishment request from the second SMF; and transmitting, at least partly based on the response, a forwarded response of the PDU session establishment to the wireless device.

In some examples, indicating the anchor network being the second network includes indicating the PDU session identifier registered with the SMF of the second network. Furthermore, indicating the anchor network being the second network can include indicating the PDU session type to the second network that is equipped with an access traffic steering, switching and splitting (ATSSS) of the multi-access PDU session across the plurality of access networks. Finally, indicating the anchor network being the second network can include indicating a single network slice selection assistance information (S-NSSAI) that supports a PDU session across the plurality of access networks with the anchor network being the second network.

The foregoing summary is intended to be illustrative and is not meant in a limiting sense. Many features of the embodiments may be employed with or without reference to other features of any of the embodiments. Additional aspects, advantages, and/or utilities of the presently disclosed technology will be set forth in part in the description that follows and, in part, will be apparent from the description, or may be learned by practice of the presently disclosed technology.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the disclosed subject matter. It should be understood, however, that the disclosed subject matter is not limited to the precise embodiments and features shown. The accompanying drawings, which are incorporated in and constitute a part of this specification, illustrate an implementation of systems, methods, and devices consistent with the disclosed subject matter and, together with the description, serves to explain advantages and principles consistent with the disclosed subject matter, in which.

DETAILED DESCRIPTION

Figure 1:
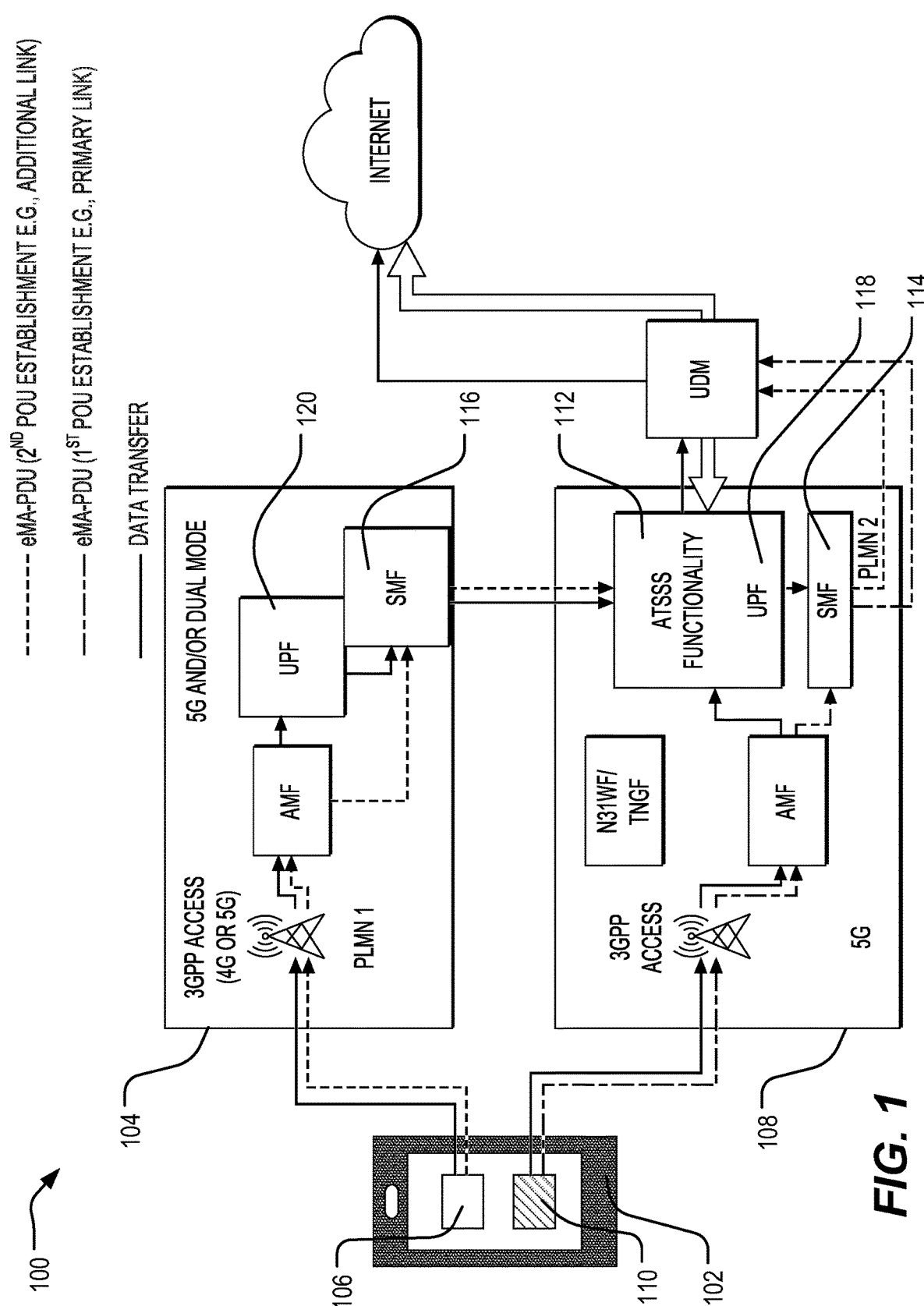
FIG. 1 illustrates an example system including a multi-network environment for implementing an enhanced multi-access PDU session.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

I. Terminology

The phraseology and terminology employed herein are for the purpose of description and should not be regarded as limiting. For example, the use of a singular term, such as, "a" is not intended as limiting of the number of items. Further, it should be understood that any one of the features of the presently disclosed technology may be used separately or in combination with other features. Other systems, methods, features, and advantages of the presently disclosed technology will be, or become, apparent to one with skill in the art upon examination of the figures and the detailed description. It is intended that all such additional systems, methods, features, and advantages be included within this description, be within the scope of the presently disclosed technology, and be protected by the accompanying claims.

Further, as the presently disclosed technology is susceptible to embodiments of many different forms, it is intended that the present disclosure be considered as an example of the principles of the presently disclosed technology and not intended to limit the presently disclosed technology to the specific embodiments shown and described. Any one of the features of the presently disclosed technology may be used separately or in combination with any other feature. References to the terms "embodiment," "embodiments," and/or the like in the description mean that the feature and/or features being referred to are included in, at least, one aspect of the description. Separate references to the terms "embodiment," "embodiments," and/or the like in the description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the presently disclosed technology may include a variety of combinations and/or integrations of the embodiments described herein. Additionally, all aspects of the present disclosure, as described herein, are not essential for its practice. Likewise, other systems, methods, features, and advantages of the presently disclosed technology will be, or become, apparent to one with skill in the art upon examination of the figures and the description. It is intended that all such additional systems, methods, features, and advantages be included within this description, be within the scope of the presently disclosed technology, and be encompassed by the claims.

Any term of degree such as, but not limited to, "substantially," as used in the description and the appended claims, should be understood to include an exact, or a similar, but not exact configuration. The terms "comprising," "including" and "having" are used interchangeably in this disclosure. The terms "comprising," "including" and "having" mean to include, but not necessarily be limited to the things so described.

Lastly, the terms "or" and "and/or," as used herein, are to be interpreted as inclusive or meaning any one or any combination. Therefore, "A, B, or C" or "A, B, and/or C" mean any of the following: "A," "B," or "C"; "A and B"; "A and C"; "B and C"; "A, B and C." An exception to this definition will occur only when a combination of elements, functions, steps or acts are in some way inherently mutually exclusive.

II. General Architecture

Systems, methods, and devices disclosed herein can address the aforementioned issues such that a micro coverage network or Mobile Virtual Network Operator (MVNO) (e.g., a hybrid (H)-MVNO) and a macro coverage network or Mobile Network Operator (MNO) network may work together and provide a smooth handover/seamless handover of a PDU session from the MVNO network and/or access network to the MNO network and/or access network.

In some examples, a wireless device or user equipment (UE) may establish an enhanced multi-access PDU session that comprises a first PDU session establishment via a first SIM and a first network, and a second PDU session establishment via a second SIM and a second network. In some instances, the UE can use an anchor network, where the anchor network manages the multi-access PDU session, and the user plane function of the anchor network performs traffic steering, splitting and switching function for the multi-access PDU session. A decision on which network is the anchor network can be determined by the UE triggering the multi-access PDU session, for example, by indicating subscription information, coverage, link quality, cost, and/or the like. This can provide flexible setup of a multi-access PDU session across multiple different types of networks where the multi-access PDU session may be established via multiple 3GPP accesses, multiple non-3GPP access, combinations of 3GPP and non-3GPP accesses, multiple networks operated by multiple different operators, multiple network operated by a single operator, multiple networks registered using a single credential, multiple networks registered using multiple credentials, and combinations thereof.

The complexity of supporting more types of access in PDU session establishment procedures is increasing because of the growing number of MVNO deployments having varying configurations. As such to provide registrations and access network management with lower complexity at the network to maintain, a New MA-PDU (e.g., enhanced MA-PDU) can support existing MA-PDU capabilities, for instance, as an add-on feature to current session establishment protocols. Moreover, the new MA-PDU capability can be informing to the network where new MA-PDU sessions are established on top of existing MA-PDU sessions.

As such, more flexible access network configurations can be developed, and network resources can be deployed more efficiently across a plurality of networks. Additional advantages will become apparent from the disclosure below.

FIG. 1 illustrates an example system 100 including a multi-network environment for implementing a multi-access PDU session. For example, a UE 102 or "wireless device" may be registered to a first PLMN (PLMN1) 104 via a first SIM 106 (PLMN1 SIM) or "SIM1". The wireless device may be registered to a second PLMN 108 (PLMN2) via a second SIM 110 (PLMN2 SIM) or "SIM2". An access traffic steering, switching and splitting (ATSSS) 112 network function (NF) may reside in PLMN2. A first session management function (SMF) 114 of the PLMN2 may be an anchor SMF for an enhanced MA-PDU session across two PLMN2.

In some instances, the wireless device may request a first eMA-PDU session request establishment via the PLMN2 via second SIM 110 using a PDU session ID M. Once the eMA-PDU session request is successful, such that the first SMF 114 of the PLM N2 succeeds in session establishment and ATSSS functionality setup for the eMA-PDU session, the wireless device may initiate a second eMA-PDU session establishment via the PLMN1 via SIM1. The second eMA-PDU session may utilize the PDU session ID M.

Furthermore, in some scenarios, a second SMF 116 of the PLM may forward the second eMA-PDU session establishment request to the first SMF 114 of the PLMN2, based on a home-routed roaming architecture. The first SMF 114 of PLMN2 can forward the request to a first UPF 118 of the PLMN2 that is the UPF of the first eMA-PDU session establishment.

Once two eMA-PDU sessions are established successfully, data may be forwarded from the first UPF 118 of the PLMN2 to a second UPF 120 of PLMN1 when the data is forwarded to access network of the PLMN1. A first eMA-PDU session establishment may refer the second PDU session (2nd PDU session) establishment shown in FIG. 1. A second eMA-PDU session establishment may refer to the first PDU session (1st PDU session) establishment shown in FIG. 1. The system 100 depicted in FIG. 1 can have a specification impact of home-routed roaming based 2nd eMA-PDU session establishment via PLMN1, and SMF of PLMN2 handling on two PDU establishment requests from two RANs.

Figure 2:
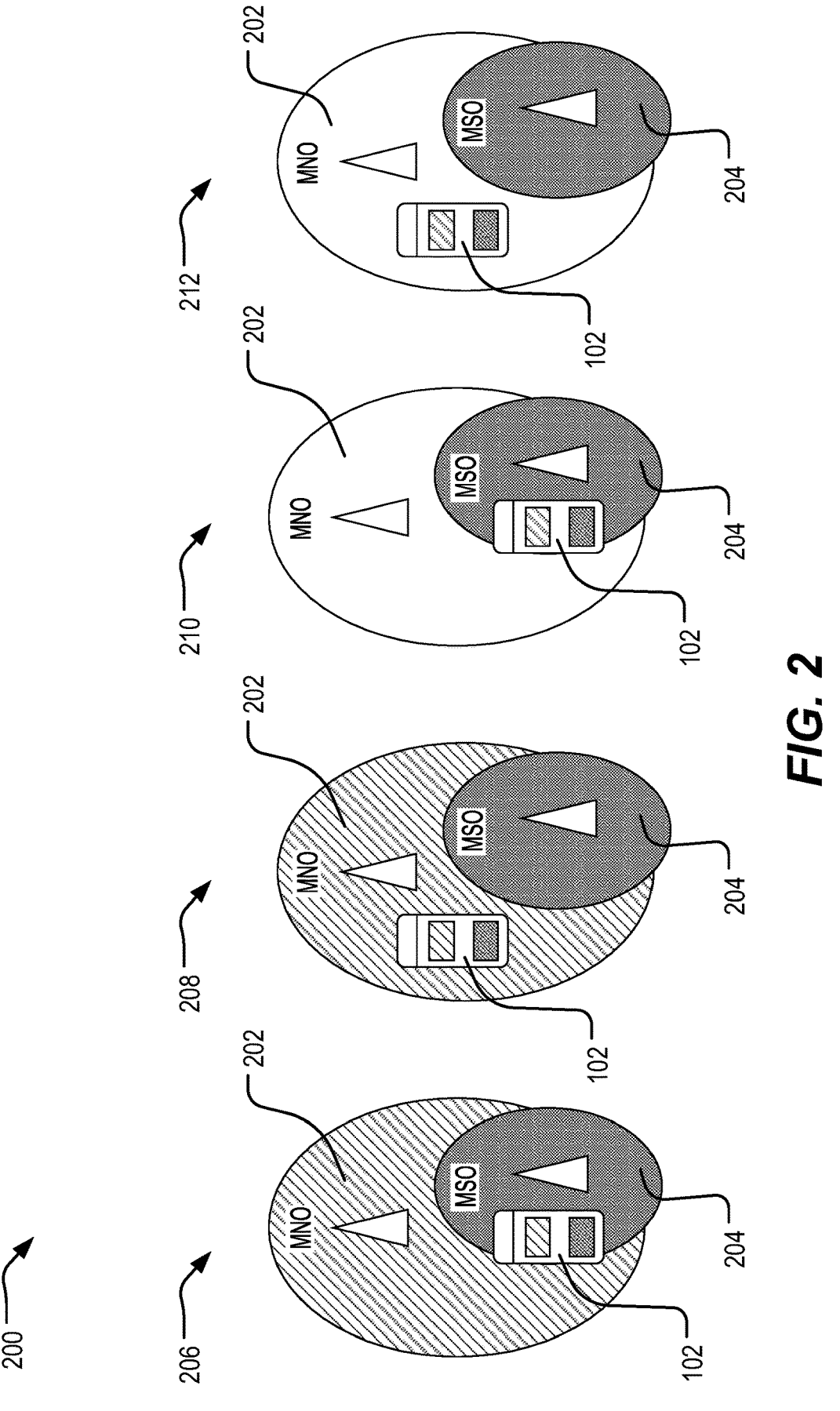
FIG. 2 illustrates an example system including various multi-network scenarios for a dual Subscriber Identity Module (SIM) device, which can form at least a portion of the system depicted in FIG. 1.

FIG. 2 illustrates an example system 200 including multiple network scenarios for a dual Subscriber Identity Module (SIM) device, which can form at least a portion of the system depicted in FIG. 1.

In some examples, when the wireless device is equipped with dual SIM (e.g., both the first SIM 106 "SIM1" and the second SIM 110 "SIM2"), the wireless device can have a first phone number via an MNO network 202 and a second phone number via an MSO network 204. Accordingly, the wireless device may be able to receive a voice call via the MNO network 202 while the wireless device receives data via the MSO network 204. The MNO network 202 can be the first PLMN 104 and the second PLMN 108, and the MSO network 204 can be the other one of the first PLMN 104 and the second PLMN 108.

The wireless device may initiate a first PDU session via the MNO network 202 that corresponds to a voice call. The wireless device may initiate a second PDU session via the MSO network that corresponds to data session.

In some instances, there can be different network scenarios that the wireless device may encounter as follows. For instance, in a first network scenario 206, the wireless device can be active/connected via MNO network 202 and via MSO network 204, and the wireless device is in coverage of MSO access network 202. The wireless device can support 'dual active' capability in this case. In a second network scenario 208, the wireless device can be active/connected via MNO network 202 and via MSO network 204, and the wireless device is outside of coverage of MSO access network 204. The wireless device can support 'dual active' capability in this case. In a third network scenario 210, the wireless device is not active via the MNO network 202 and is active/connected via the MSO network 204, and the wireless device is in coverage of MSO access network 204. The wireless device may or may not support 'dual active' capability in this case. In a fourth network scenario 212, the wireless device is not active/connected via MNO network 202 and is active/connected via MSO network 204, and the wireless device is outside of coverage of MSO access network 204. The wireless device may or may not support 'dual active' capability in this case.

For example, a base station of radio access network of the MNO network 202 may be referred as base station 1 (BS1) of radio access technology 1 (RAT1). A base station of radio access network of the MSO network 204 may be referred as base station 2 (BS2) of radio access technology 2 (RAT2). The RAT1 may be a new radio (NR). The RAT1 may be a long term evolution (LTE). The RAT1 may be a non-3GPP access such as wireless local area network (WLAN). The RAT1 may be a wired network such as cable modem or a router/bridge connecting to optical network or coax. Additionally or alternatively, the RAT2 may be a new radio (NR) of a new access network. The RAT2 may be a long term evolution (LTE). The RAT2 may be a non-3GPP access such as wireless local area network (WLAN). The RAT2 may be a wired network such as cable modem or a router/bridge connecting to optical network or coax.

Moreover, SIM1 of the wireless device may be referred as wireless device SIM1 (W-SIM1) (e.g., based on one or more specifications or standards, as discussed greater detail below). SIM2 of the wireless device is referred as wireless device SIM2 (W-SIM2).

In some example, the wireless device may be connected to the MNO network 202 directly via the first SIM 106 (e.g., SIM1). The wireless device may be connected to the MSO network 204 directly via the second SIM 110 (e.g., SIM2). The wireless device may be connected to the MNO network 202 indirectly via the second SIM 110. The wireless device of SIM2 (W-SIM2) may be connected to the MNO network 202 indirectly when the W-SIM2 is registered/connected to a base station (or an access network) of the MNO network 02 while access and mobility management function (AMF) and/or user plane function (UPF) and/or session management function (SMF) for the wireless device of SIM2 resides in core network of the MSO network 204 (e.g., or a different network from the MNO network 202).

Figure 3:
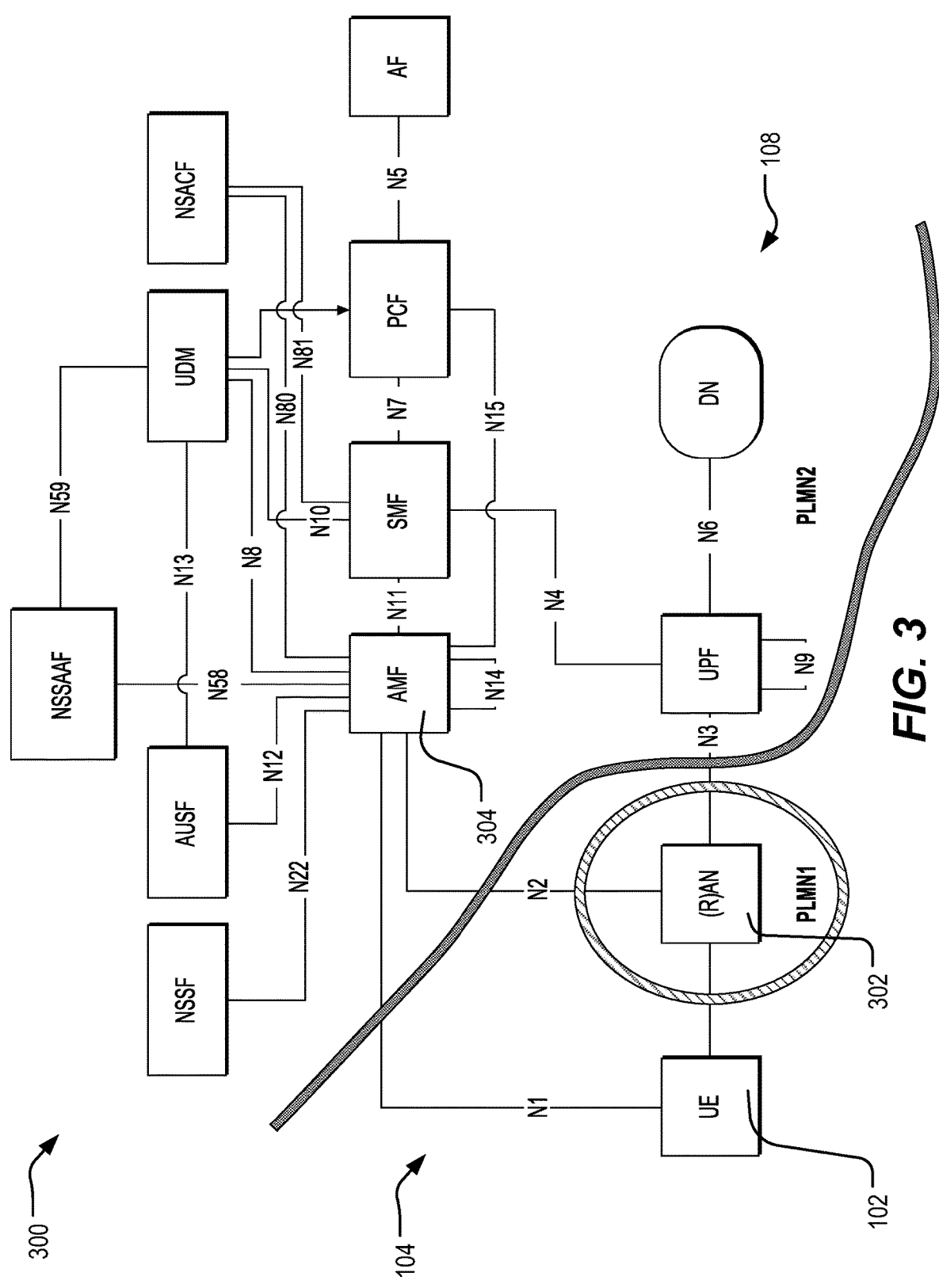
FIG. 3 illustrates an example system including a multi-network environment with a user equipment connected to first network via a radio access network (RAN) node of a second network, which can form at least a portion of the system depicted in FIG. 1.

FIG. 3 illustrates an example system 300 including a multi-network environment with a user equipment connected to first network via a radio access network (RAN) node of a second network, which can form at least a portion of the system depicted in FIG. 1. For instance, FIG. 3 illustrates that the wireless device can be indirectly connected to or registered to a network. For example, the network can be a 5G core network (e.g., the MSO network 204). The wireless device (e.g., UE 102) can communicate with a radio access network (RAN) of another network (e.g., the MNO network 202) or the RAN of another different PLMN. For example, the other network may belong to the second PLMN 108 PLMN2 (e.g., of the MSO network 204). Also, the RAN may belong to the first PLMN 104 PLMN1 (e.g., of the MNO network 202).

The RAN of PLMN1 (e.g., which may be referred as 'guest' network) may be connected to/communicated with a core network of PLMN2 (e.g., which may be referred as 'host' network or 'home' network). To make this connection, one or more of the following connection or registration procedures may be performed.

A first registration procedure (e.g., first registration procedure 402 depicted in FIGS. 4 and 5) can include a base station 302 (or the access network or RAN) of PLMN1 communicating with the first UPF 118 of PLMN2 and/or an AMF 304 of the PLMN2. This may require UE registration procedure so that the base station 302 may find the first UPF 118 and/or the AMF 304 of the PLMN2.

A second registration procedure (e.g., second registration procedure 602 depicted in FIGS. 6, 7A, and 7B) can include the base station 302 of PLMN1 communicating with the second UPF 120 of PLMN1 and/or an AMF of the PLMN1. the second UPF 120 of PLMN1 (UPF1) and/or AMF of PLMN1 (AMF1) may forward registration request and/or data to the first UPF 118 of PLMN2 (e.g., UPF2) and/or the AMF 304 of PLMN2 (e.g., AMF2).

A third registration procedure can include the base station 302 of PLMN1 communicating within the PLMN1 core network. A registration of the W-SIM2 is forwarded to the PLMN2 based on a roaming architecture, such as on a home-routed roaming architecture.

A fourth registration procedure (e.g., fourth registration procedure 802 depicted in FIGS. 8-10) can include the base station 302 of PLMN1 communicating within the PLMN1 core network. A registration of the W-SIM1 can be done with PLMN1. An enhanced multi-access PDU session establishment via PLMN1 may be established based on a home-routed roaming architecture, where anchor SMF of PLMN2 is controlling the enhanced multi-access PDU session. This option may not have impact on SIM2, but can offer a MA-PDU session across SIM1 and SIM2.

A fifth registration procedure (e.g., fifth registration procedure 1102 depicted in FIG. 11) can include the base station 302 of PLMN1 communicating within the PLMN1 core network. PLMN1 core network can have N3IWF or N3IWF equivalent that interfaces (e.g., TNGF) between RAN of PLM N1 and core network of PLMN2.

These registration procedures are discussed in greater detail below.

Figure 4:
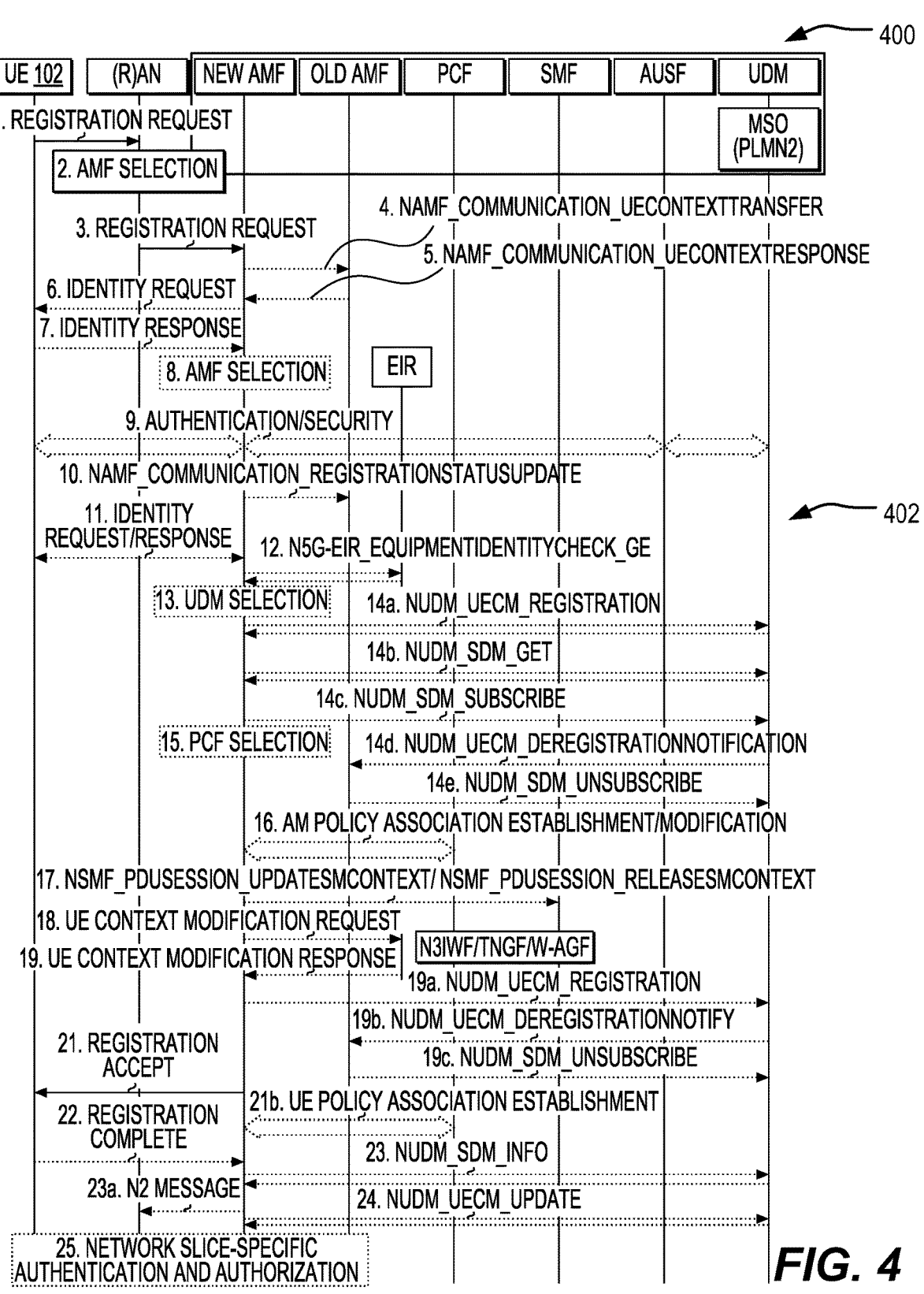
FIG. 4 illustrates an example system including a registration procedure for providing a multi-access PDU session, which can form at least a portion of the system depicted in FIG. 1.
Figure 5:
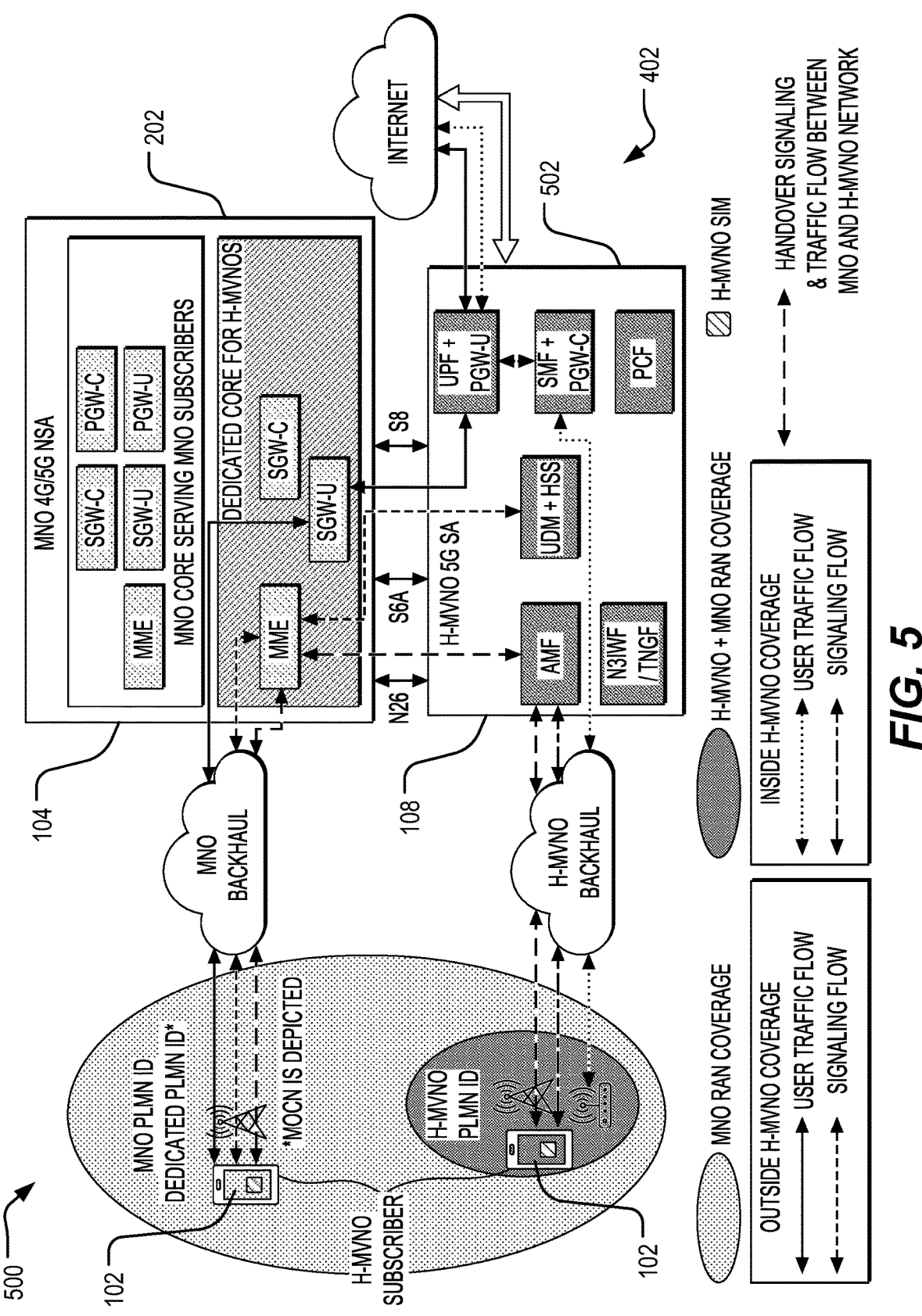
FIG. 5 illustrates an example system including a multi-network environment for implementing a multi-access PDU session with a dedicated core architecture, which can form at least a portion of the system depicted in FIG. 1.

FIGS. 4 and 5 illustrate example systems 400 and 500 including a first registration procedure 402 for providing a multi-access PDU session, which can form at least a portion of the system depicted in FIG. 1. As noted above, the first connection procedure 402 can include a base station 302

(e.g., or the access network or RAN) of PLMN1 communicating with the first UPF 118 of PLMN2 and/or an AMF 304 of the PLMN2. This may require a UE registration procedure so that the base station 302 may find the first UPF 118 and/or the AMF 304 of the PLMN2.

As shown in the data call flow diagram depicted in FIG. 4, the wireless device (SIM2, W-SIM2) may request registration (step 1) indicating to access to PLMN2 via RAN of PLMN1. The RAN of PLMN1 may identify AMF 304 of PLMN2 for the W-SIM2 based on the registration.

This may be performed via a dedicated core option as shown in FIG. 5. For example, a Mobility Management Entity (MME) of the dedicated core may be replaced by an AMF in the dedicated core.

FIG. 5 illustrates an example system 500 including a multi-network environment (e.g., the MNO network 202 and an H-MVNO network 502) for implementing a multi-access PDU session with a dedicated core architecture (e.g., for Hybrid (H)-MVNOs), which can form at least a portion of the system depicted in FIG. 1.

In some examples, the dedicated core architecture option depicted in FIG. 5 performs the first registration procedure 402 and/or alleviates the impact of ping-pong handovers and the risk to MNO core operation. The H-MVNO users' signaling, and user traffic streams can be processed within the dedicated core rather than the MNO's core, thereby isolating signaling load generated from the mobility of the H-MVNO's user devices from that of the MNO's user devices. The dedicated core can comprise a dedicated mobility management entity (MME) and, optionally, an SGW (e.g., SGW-C+SGW-U).

In some examples, the dedicated core can be deployed and managed within the MNO network 202 (as shown in FIG. 5) or externally, depending on the MNO's operational policies. In some instances, a single dedicated core can be shared across several H-MVNOs having an agreement with the MNO. The dedicated core can separate the traffic of each H-MVNO through the PLMN identity (part of the international mobile subscriber identity, IMSI) and route it to the appropriate anchor points in the H-MVNO home networks. The MME hosted within the dedicated core can perform a DNS query to select the SMF+PGW-C in individual H-MVNO networks, giving them full control over their subscribers' traffic.

In some instances, depending on the capabilities of the H-MVNO devices and the MNO access network, the dedicated core can be implemented using one of the following standards-based connection processes: a first connection process based on Multi Operator Core Network (MOCN) specifications; and/or a second connection process based on Dedicated Core (DECOR) or Enhanced Dedicated Core (eDECOR), which are standardized 3GPP features.

In the first connection process based on MOCN specifications the MNO access network can broadcast two PLMN IDs—one for its core network and one for the dedicated core. The dedicated core PLMN ID broadcast by the MNO can be distinct from that used by the H-MVNOs in their home networks. The H-MVNO user devices can be programmed to access the dedicated core PLMN ID when outside of H-MVNO access network coverage. As described previously, the dedicated core can use the home PLMN embedded in the international mobile subscriber identity (IMSI) to route the traffic to each H-MVNO network 502. Several advanced MOCN features, such as PLMN-specific configurations, parameters for access barring, handovers, and redirection can provide distinct handover settings for MNO and H-MVNO user devices. This can enable handover parameter configurations to be customized, facilitating handovers between MNO networks 202 and H-MVNO networks 502 that do not impact the handover operation and performance for MNO user devices (e.g., the UE 102).

In the second connection process based on DECOR or eDECOR standards, implementing the DECOR feature in the MNO core and access network can redirect traffic to the dedicated core based on information received in the subscription profile from the H-MVNO home subscriber server (HSS). eDECOR-aware UEs (e.g., UE 102) can provide the dedicated core network ID (DCN-ID) when it is accessing the MNO network 202, which uses it to route traffic to the dedicated core. A key advantage of this approach is that the MNO does not have to broadcast multiple PLMN IDs. However, MNO access and core networks need to support the DECOR redirection/routing capabilities to have H-MVNO users serviced by the core dedicated to the H-MVNO network 502. In addition, to isolate the handover configurations for MNO and H-MVNO devices, additional functionality can be implemented in the MNO access network. One standards-based approach is to tie custom handover configurations by using a standardized index called the RAT Frequency Selection Priority ID (RFSP ID). Some MNOs do not require separate access barring configurations for their MVNO user devices, which can overcome DECOR issues related to the MNO having difficulty configuring separate access barring settings for H-MVNO user devices.

Figure 6:
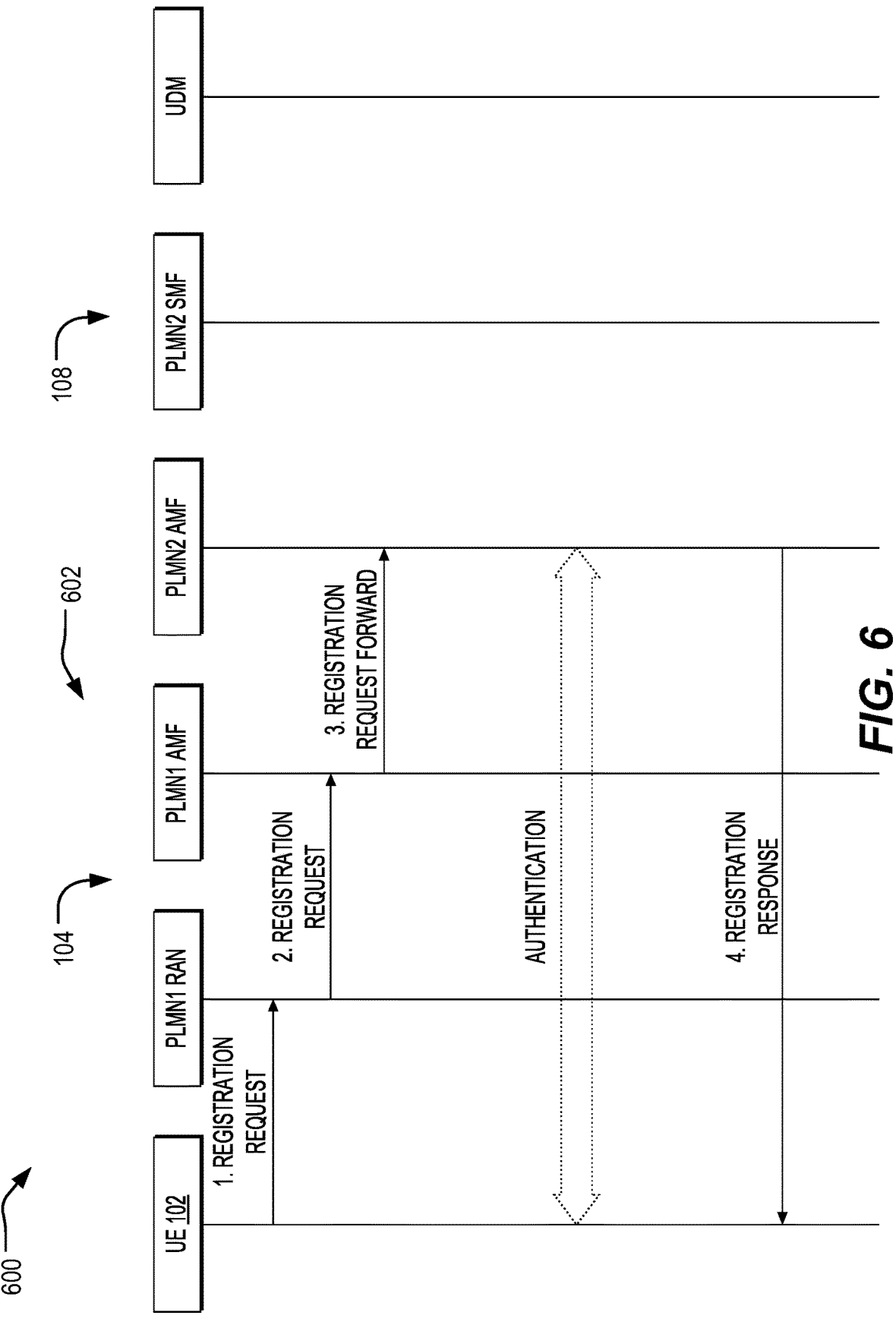
FIG. 6 illustrates an example system including a registration procedure for providing a multi-access PDU session, which can form at least a portion of the system depicted in FIG. 1.
Figure 7A:
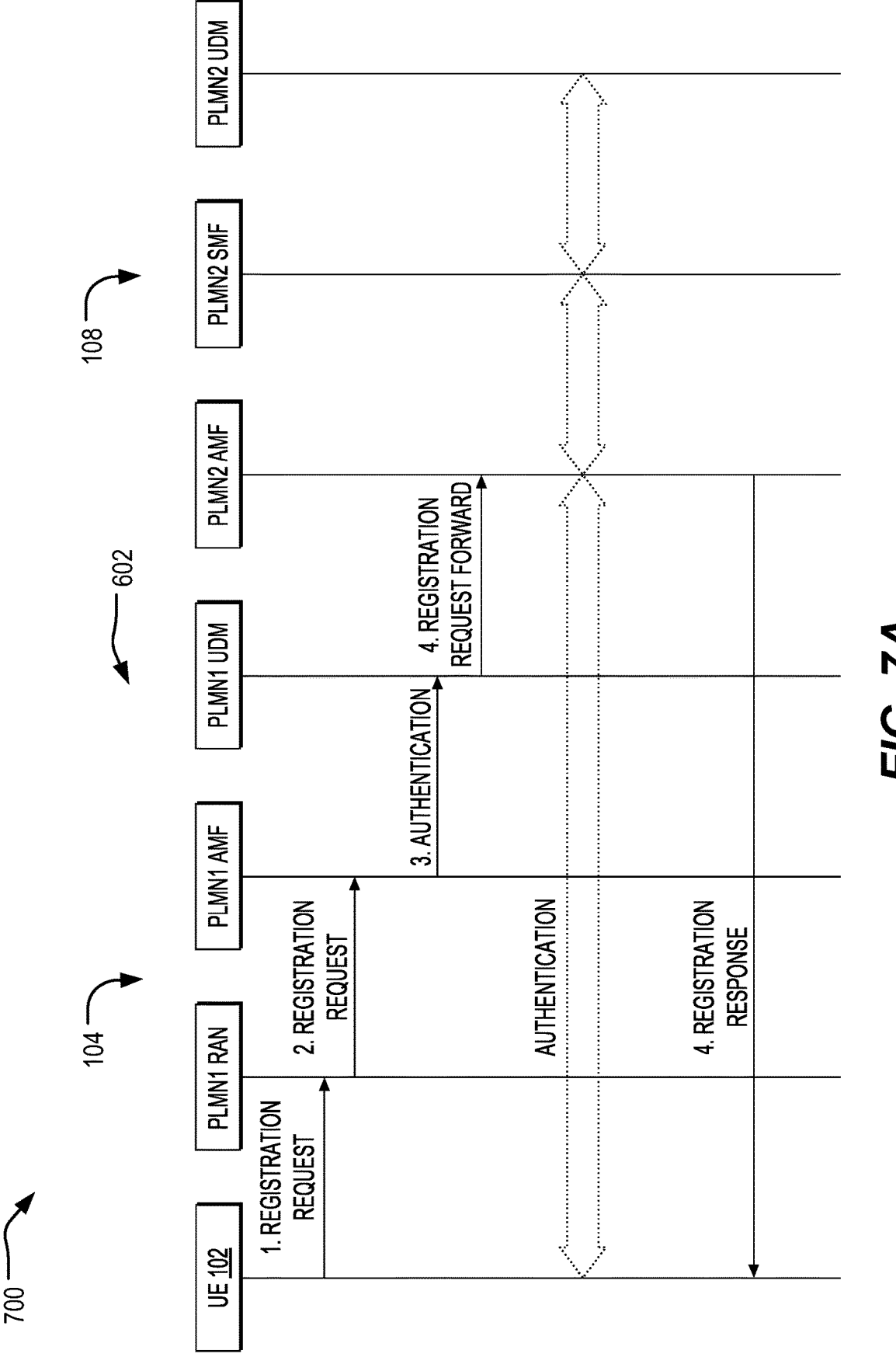
FIGS. 7A and 7B illustrate an example system including registration procedures for providing a multi-access PDU session, which can form at least a portion of the system depicted in FIG. 1.
Figure 7B:
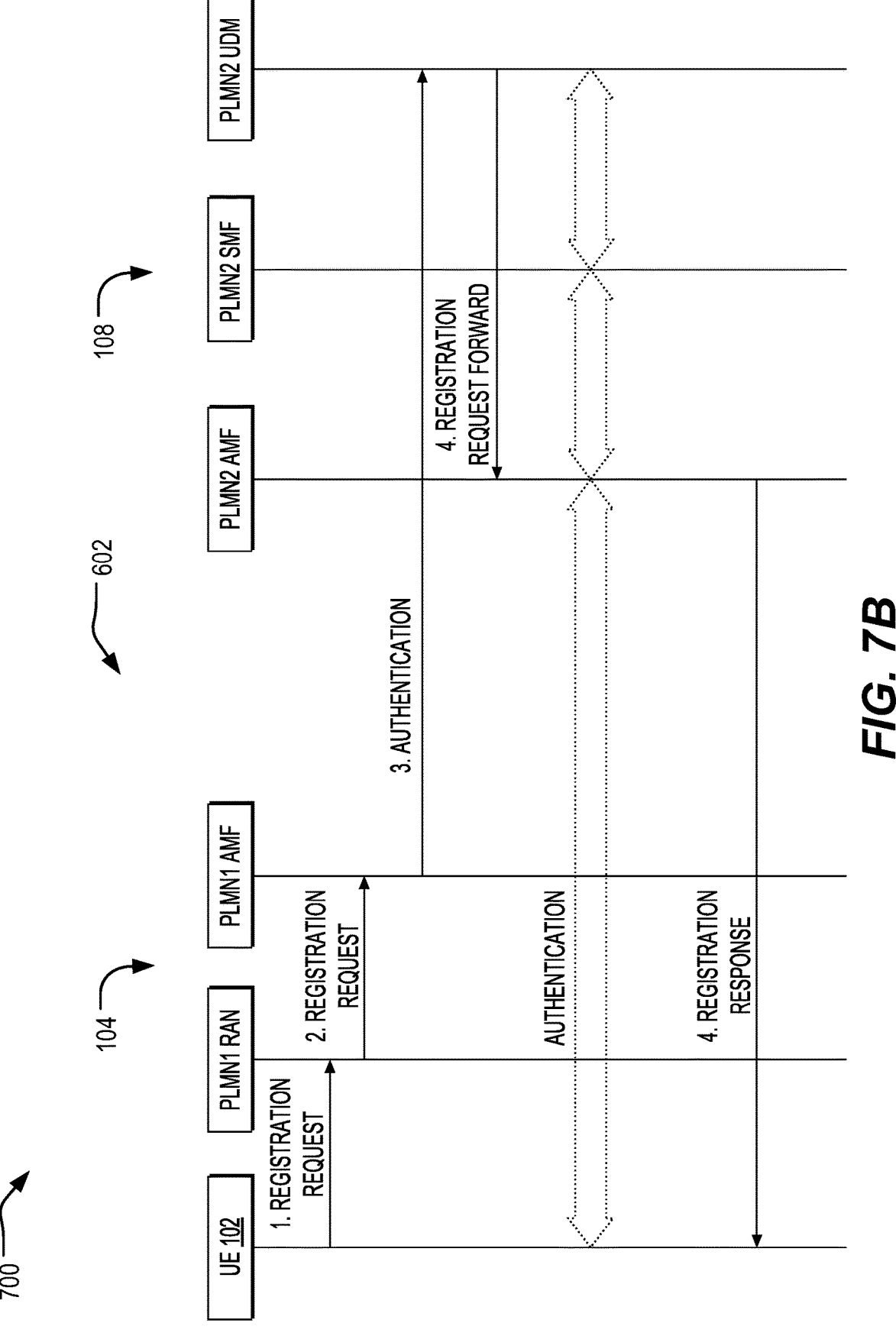

FIGS. 6, 7A, and 7B illustrate example systems 600 and 700 including a second registration procedure 602 for providing a multi-access PDU session, which can form at least a portion of the system depicted in FIG. 1. As noted above, the second registration procedure 602 can include the base station 302 of PLMN1 communicating with the second UPF 120 of PLMN1 and/or an AMF of the PLMN1. the second UPF 120 of PLMN1 (UPF1) and/or AMF of PLMN1 (AMF1) may forward registration request and/or data to the first UPF 118 of PLMN2 (e.g., UPF2) and/or the AMF 304 of PLMN2 (e.g., AMF2).

In some examples, the PLMN1 AMF and PLMN2 AMF can communicate via a direct/indirect interface (e.g., a new interface). For example, PLMN1 AMF and PLMN2 AMF may communicate via PLMN1 SMF and PLMN2 SMF, and PLMN2 SMF may communicate with AMF.

Turning to FIGS. 7A and 7B illustrate an example system 700 including an example of the second registration procedure 602 for providing a multi-access PDU session, which can form at least a portion of the system depicted in FIG. 1.

As shown in FIGS. 7A and 7B, the wireless device (e.g., the UE 102) may send a registration request to PLM1 AMF that will be forwarded to PLMN1 UDM. The PLMN1 UDM may forward registration request to PLMN2 AMF. Additionally or alternatively, PLM AMF may communicate with PLMN2 UDM directly. The PLMN2 UDM may forward registration request to PLMN2 AMF.

Furthermore, the system(s) disclosed herein can perform the third registration procedure which can include the base station 302 of PLMN1 communicating within the PLMN1 core network, and a registration of the W-SIM2 being forwarded to the PLMN2 based on a roaming architecture, for example, based on home-routed roaming architecture.

In some examples, the third registration procedure includes the W-SIM2 initiating a registration via PLMN1, where one or more parameters of the registration request may indicate that this registration is for utilizing a PDU session of PLMN2. For example, the one or more parameters of registration requests may indicate at least one of the following: registration type; a subscription concealed identifier (SUCI) or 5G-globally unique temporary ID (GUTI) or permanent equipment identifier (PEI); security parameters; an additional GUTI; 4G Tracking Area Update; the indication that the UE is moving from an evolved packet system (EPS); or if the UE is registering with a stand-alone non-public network (SNPN), the network identifier (NID) of the SNPN that assigned the 5G-GUTI. Registration information of W-SIM2 may optionally be forwarded to PLMN2.

Furthermore, in some instances, the wireless device may establish a session based on a home-routed roaming architecture in the third registration procedure. This step may also be performed in the fourth registration procedure 802 discussed below.

Figure 8:
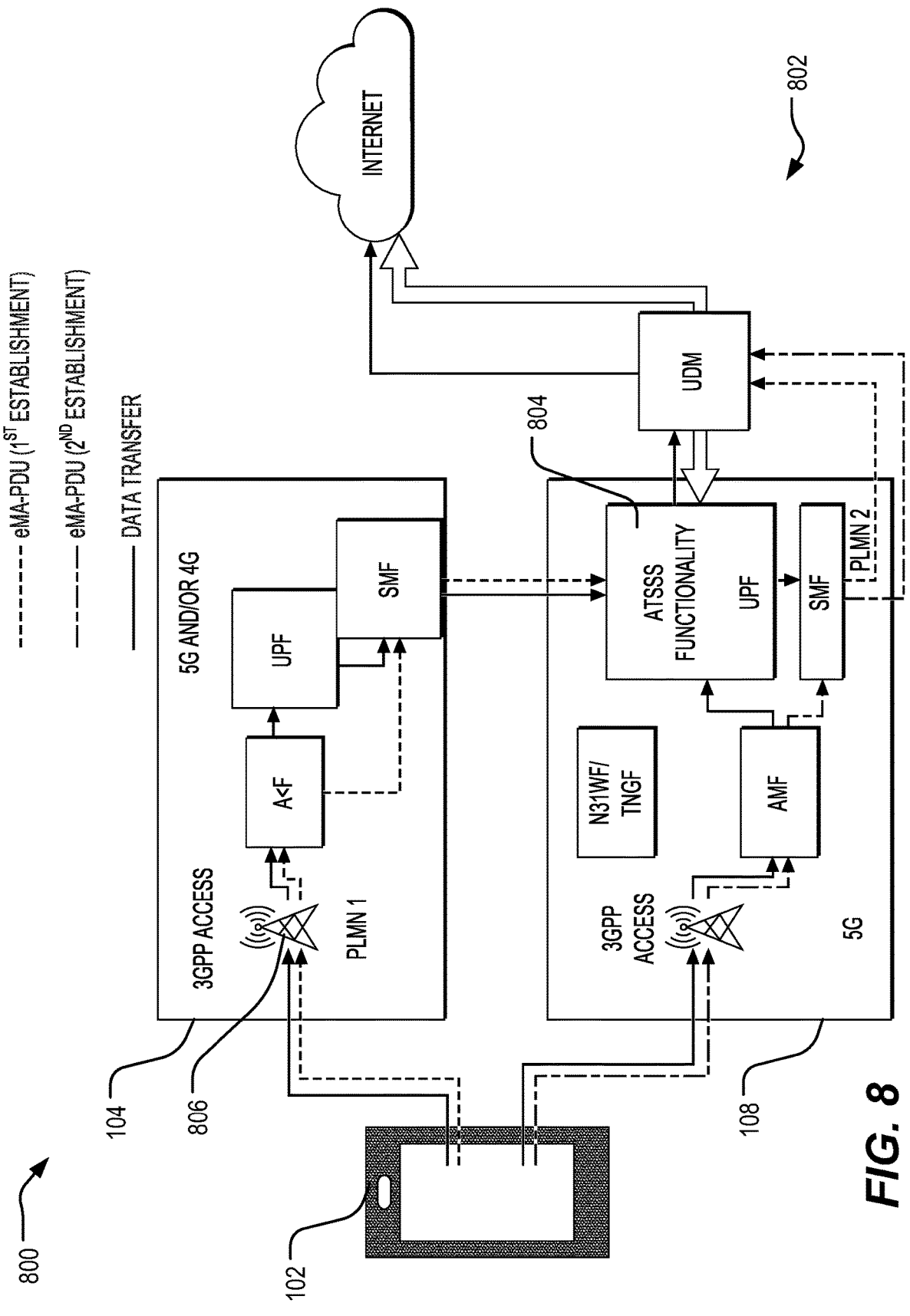
FIG. 8 illustrates an example system including a multi-network environment for implementing a multi-access PDU session with an anchor session management function (SMF), which can form at least a portion of the system depicted in FIG. 1.

FIG. 8 illustrates an example system 800 including a multi-network environment for performing the fourth registration procedure 802 by implementing a multi-access PDU session with an anchor session management function (SMF), which can form at least a portion of the system depicted in FIG. 1. The fourth registration procedure 802 can include the base station 302 of PLMN1 communicating within the PLMN1 core network. A registration of the W-SIM1 can be done with PLMN1. An enhanced multi-access PDU session establishment via PLMN1 may be established based on a home-routed roaming architecture, where an anchor SMF of PLMN2 is controlling the enhanced multi-access PDU session. This registration procedure may not have an impact on SIM2, but can offer a MA-PDU session across SIM1 and SIM2.

In some examples, an access traffic steering, switching and splitting (ATSSS) feature 804 may be supported by the UE 102 and the 5GC network. The ATSSS feature 804 can enable a multi-access PDU (MA-PDU) Connectivity Service, which can exchange PDUs between the UE 102 and a data network by simultaneously using one 3GPP access network (e.g., RAN 806) and one non-3GPP access network and two independent N3/N9 tunnels between the PSA and RAN/AN. The ATSSS feature 804 can enable an enhanced multi-access PDU (eMA-PDU) Connectivity Service, which can exchange PDUs between the UE 102 and a data network by simultaneously using two 3GPP access networks (and one non-3GPP access network). There can be two independent N3/N9 tunnels between the PSA and each RAN/AN of the two 3GPP access networks. Additionally another N3/N9 tunnel between the PSA and a RAN/AN (anchor RAN/AN) of the non-3GPP access network may be also setup. The ATSSS feature 804 can enable an enhanced multi-access PDU (eMA-PDU) Connectivity Service, which can exchange PDUs between the UE 102 and a data network by simultaneously using two non-3GPP access networks (and one 3GPP access network). There can be two independent N3/N9 tunnels between the PSA and each RAN/AN of the two non-3GPP access networks. Additionally another N3/N9 tunnel between the PSA and a RAN/AN (anchor RAN/AN) of the 3GPP access network may be setup.

In some instances, The enhanced multi-access PDU Connectivity Service is realized by establishing an enhanced Multi-Access PDU (MA PDU) Session, e.g., a PDU Session that may have user-plane resources on two or more access networks. This can occur in scenarios where both 3GPP access networks (and non-3GPP access) are allowed for the single-network slice selection assistance information (S-NS-SAI) of the PDU Session.

In some examples, the UE 102 may request an eMA PDU Session when the UE 102 is registered via both 3GPP networks (and non-3GPP accesses), or when the UE 102 is registered via one access only (and non-3GPP accesses) or when the UE 102 is registered with both non-3GPP access (and 3GPP access(es)).

In some instances, after the establishment of a MA PDU Session, and when there are user-plane resources on both access networks, the UE 102 can apply network-provided policy (i.e. ATSSS rules) and can consider local conditions (such as network interface availability, signal loss conditions, user preferences, etc.) for deciding how to distribute the uplink traffic across the two access networks. Similarly, the UPF anchor (e.g., PLM N2, an anchor UPF, UPF of an anchor PLMN, UPF of a home PLMN) of the eMA PDU Session can apply network-provided policy (e.g., N4 rules) and feedback information received from the UE 102 via the user-plane (such as access network Unavailability or Availability) for deciding how to distribute the downlink traffic across the two (or more) N3/N9 tunnels and two (or more) access networks. When there are user-plane resources on only one access (or less number of access than what eMA-PDU session supports) network, the UE 102 can apply the ATSSS rules and considers local conditions for triggering the establishment or activation of the user plane resources over another (or one or more) access. In some scenarios, a type of a eMA PDU Session may be one of the following types defined in clause 5.6.1 of technical specification TS 23.501 related to IPv4, IPv6, IPv4v6, and/or Ethernet.

In some scenarios, if the UE 102, due to mobility, moves from being served by a source AMF supporting ATSSS to a target AMF not supporting ATSSS, the eMA PDU Session can be released as described in the standard outlined at TS 23.502. Deployment of ATSSS that is homogeneous per PLMN or network slice can enable consistent behavior. In the case of non-homogenous support of ATSSS in a PLMN/slice (e.g., some NFs in a PLMN/slice may not support ATSSS), MA PDU Sessions can be released due to UE mobility.

In some examples, an enhanced Multi-Access PDU Session may, for the 3GPP access, use user-plane resources of an associated PDN Connection on 3GPP access in EPC (e.g., 4G network, LTE network, LTE core network) instead of the 3GPP access to 5GC (e.g., 5G core, 5G network, and/or NR core network). This can provide a scenario where an eMA PDU Session can simultaneously be associated with user-plane resources on 3GPP access network connected to EPC and 3GPP access connected to 5GC (e.g., and non-3GPP access connected to 5GC). Such use of ATSSS with EPS interworking may apply to Ethernet and IP-based PDU Session and PDN Connection types.

In some scenarios, an eMA PDU Session with one or more 3GPP accesses connected to 5GC and one non-3GPP access connected to EPC is not supported. In some examples, NBIFOM and the multi-access connectivity described in this clause are not deployed in the same network. Furthermore, to the MME and SGW this can be a regular PDN Connection and the support for ATSSS can be transparent to MME and SGW.

Furthermore, for a eMA PDU Session established for the Ethernet PDU Session type, if the UE 102 has not indicated support for Ethernet PDN connection type, or if the network does not support Ethernet PDN connection type, when the 3GPP access use user-plane resources of an associated PDN Connection, the following operations can take place: (i) the SMF+PGW-C can consider that the enhanced Multi-Access PDU Session is still using the Ethernet PDU Session/PDN Connection type but in a restricted mode where EPS signaling can only refer to non-IP PDN Connection type; (ii) multi-access rule (MAR) rules in the UPF can still be used for distributing DL traffic between one or more 3GPP access and non-3GPP access; and/or for traffic on 3GPP access, the SMF may update N4 rules and QoS rules/EPS bearer contexts on the UE 102 to take into account that no QoS differentiation is possible over one or more 3GPP access.

An example scenario involving an Enhanced Multi Access PDU Sessions Procedure is discussed below.

In some instances, the 5GC supports a PDU Connectivity Service, e.g., a service that provides exchange of PDUs between a UE 102 and a data network identified by a data network number (DNN). The PDU Connectivity Service can be supported via PDU Sessions that are established upon request from the UE 102.

In some examples, a first AMF of PLMN1 can be a first serving AMF—mainly for SIM1 or SIM2 based on home-routed roaming scenario or the third registration procedure, and a second AMF of PLMN2 as a second serving AMF. The Subscription Information for each S-NSSAI may contain a Subscribed DNN (data network name) list and one default DNN. When the UE 102 does not provide a DNN in a NAS (non-access stratum) Message containing eMA-PDU Session Establishment Request for a given S-NSSAI, the serving AMF (e.g., the first serving AMF and/or the second serving AMF) can determine the DNN for the requested PDU Session by selecting the default DNN for this S-NSSAI if a default DNN is present in the UE's Subscription Information; otherwise the serving AMF (e.g., the first serving AMF and/or the second serving AMF) can select a locally configured DNN for this S-NSSAI (single network slice selection assistance information).

In some scenarios, if the DNN provided by the UE 102 is not supported by the network and AMF cannot select an SMF by querying NRF, the AMF rejects the NAS Message containing PDU Session Establishment Request from the UE 102 with a cause indicating that the DNN is not supported unless the PCF provided the policy to perform a DNN replacement of unsupported DNNs.

In some examples, in a PDU Session Establishment Request message sent to the network, the UE 102 provides a PDU Session ID. The PDU Session ID is unique per the UE 102 and is the identifier used to uniquely identify one of a UE's PDU Sessions. The wireless device/UE 102 may initiate first PDU session establishment request via PLMN1 with a PDU session ID. The wireless device/UE 102 may initiate second PDU session establishment request via PLMN2 with the PDU session ID.

In some instances, the PDU Session ID is stored in the UDM to support handover between two 3GPP accesses and/or between accesses of the eMA-PDU sessions when different PLMNs are used for the two or more accesses. The UE 102 may also provide: (a) a PDU Session Type indicating eMA-PDU session; (b) S-NSSAI of the HPLMN (home PLMN) that matches the application (that is triggering the PDU Session Request) within the NSSP in the URSP rules or within the UE Local Configuration as defined in clause 6.1.2.2.1 of TS 23.503 [45] (eMA-PDU may not be supported with home-routed roaming scenario or with handover, and/or the home PLMN may be referred as PLMN2 in the embodiments; and/or (c) S-NSSAI of the Serving PLMN (e.g., the PLMN1 for the first PDU session establishment, and/or the PLMN2 for the second PDU session establishment) from the Allowed NSSAI, corresponding to the S-NSSAI of the HPLMN in (b). In the eMA-PDU scenario, the UE 102 can provide in the PDU Session Request both the S-NSSAI of the PLMN2 (e.g., HPLMN) and the S-NSSAI of the PLMN1 (e.g., Visitor PLMN) from the Allowed NSSAI (c) that maps to the S-NSSAI of the HPLMN. The UE 102 may also provide the Data Network Name (DNN).

Furthermore, in some instances, the UE 102 may provide, if the PDU session type is eMA-PDU session, a parameter indicating a home network or anchor network that may be present. For example, the parameter may indicate an anchor network of the eMA-PDU session being the PLMN2 by indicating a PLMN ID of the PLMN2 as the parameter. The parameter may indicate an anchor network of the eMA-PDU session being the PLMN2 by indicating the eMA-PDU session identifier that is registered with the SMF of the PLMN2. For example, the parameter may indicate an anchor network of the eMA-PDU session being the PLMN2 by indicating the eMA-PDU session type to the first network that is equipped with the ATSSS of the eMA PDU session across a plurality of access networks comprising RAN1 and RAN2. For example, RAN1 can be a NR or LTE. For example, the parameter may indicate an anchor network of the eMA-PDU session being the PLMN2 by indicating a single network slice selection assistance information (S-NS-SAI) that supports the eMA-PDU session across the PLMN1 and PLMN2 with the anchor network being the PLMN2.

The SMF shall be registered and deregistered on a per PDU Session granularity in the UDM. For example, for supporting eMA-PDU session, a first SMF of the PLMN1 and a second SMF of the PLMN2 may be registered for the eMA-PDU session in the UDM. For example, the first SMF may select UPF(s) of the PLMN1. The first SMF may select UPF(s) of the PLMN2. The second SMF may select UPF(s) of the PLM N1 and/or PLMN2.

In some examples, for supporting eMA-PDU session, a SMF of the PLMN2 may be registered as an anchor SMF for the eMA-PDU session in the UDM. For supporting eMA-PDU session, a SMF of the PLMN1 may be registered as an anchor SMF for the eMA-PDU session in the UDM.

Furthermore, PDU Sessions can be established (e.g., upon UE request), modified (e.g., upon UE and 5GC request) and/or released (e.g., upon UE and 5GC request) using non-access stratum (NAS) SM signaling exchanged over N1 between the UE 102 and the SMF. For example, a first eMA-PDU session of the eMA-PDU session via PLMN1 may be done using first NAS SM signaling exchanged over first N1 interface between the UE 102 and the first SMF (e.g., SMF1, SMF of the PLMN1). For example, a second eMA-PDU session of the eMA-PDU session via PLMN2 may be done using second NAS SM signaling exchanged over second N1 interface between the UE 102 and the second SMF (e.g., SMF2, SMF of the PLMN2).

In some scenarios, in the eMA-PDU session establishment, the first NAS SM of the first eMA-PDU session establishment via the PLMN1 may terminate in the first SMF of the PLMN1. The second NAS SM of the second eMA-PDU session establishment via the PLMN2 may terminate in the second SMF of the PLMN2. Furthermore, an N1 interface may be present between a wireless device/UE 102 and an AMF.

Figure 9:
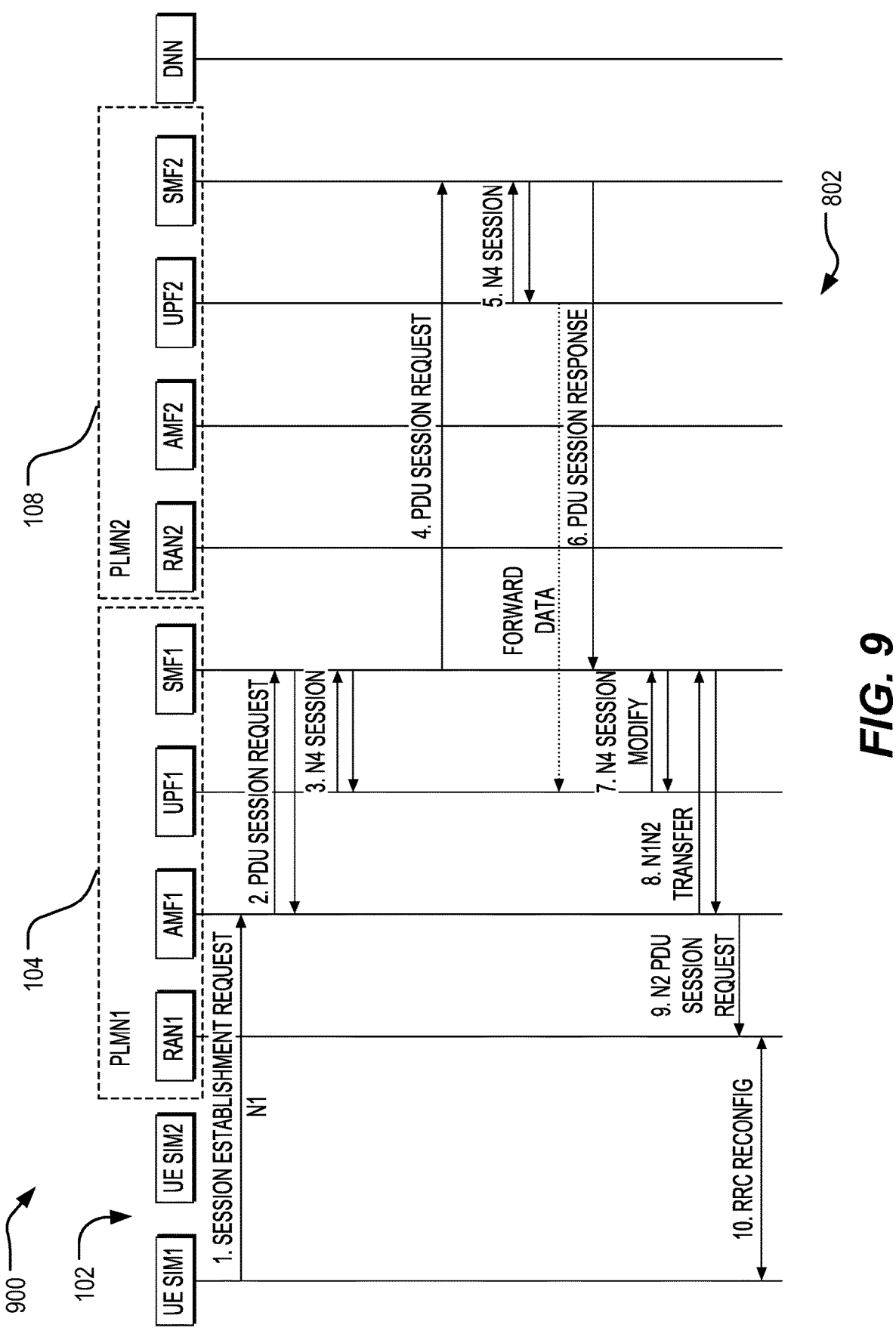
FIG. 9 illustrates an example system including a registration procedure for providing a multi-access PDU session, which can form at least a portion of the system depicted in FIG. 1.

FIG. 9 illustrates an example system including the fourth registration procedure 802 for providing a multi-access PDU session, which can form at least a portion of the system depicted in FIG. 1. FIG. 9 illustrates an example procedure/ call flow of the first eMA-PDU session establishment of the fourth registration procedure 802.

In some examples, the first eMA-PDU session establishment may be based on a home-routed roaming architecture shown in TS 23.502 4.3.2.2.2 and/or TS 23.501 5.6.3. When PLMN1 is same as PLMN2, the first eMA-PDU session establishment may be based on a non-roaming architecture. In this case, SMF1 may be same as SMF2. Additionally, when SMF2 (SMF of the PLMN2) receives the request of the eMA-PDU session establishment, the SMF2 may determine whether the eMA-PDU session is already established via PLMN2. Otherwise, the SMF2 may reject the request.

In some instances, the SMF of PLMN1 can determine a PDU is based on home-routed roaming (e.g., forward) or based on non-roaming. For instance, when the SMF of PLMN1 receives a PDU session establishment request via SIM2 of the wireless device/UE 102, the SIM2 of the wireless device is registered as a roaming wireless device from the PLMN1 perspective. Thus, when W-SIM2 (e.g., SIM2 of the wireless device) sends the first eMA-PDU session establishment request, the SMF of the PLMN1 forwards the request based on the home-routed roaming architecture. When SIM1 of the wireless device sends the first eMA-PDU session establishment request, the SIM1 of the wireless device can be registered via the PLMN1 as a non-roaming wireless device.

To support various scenarios, some techniques include indicating whether a eMA-PDU session establishment is based on a home-routed roaming architecture or non-roaming architecture. For example, the wireless device/UE 102 may indicate which architecture the eMA-PDU session is requested based on. The wireless device/UE 1-2 may indicate home-routed roaming architecture for the first eMA-PDU session establishment request. The wireless device/UE 102 may indicate non-roaming architecture for the second eMA-PDU session establishment request. The wireless device/UE 102 may indicate a parameter in a PDU session establishment request indicating which roaming architecture the PDU session establishment request is based on.

In another example, the wireless device/UE 102 may register a plurality of times via different accesses for the eMA-PDU session. For example, the SIM1 of the wireless device/UE 102 may register as non-roaming UE for the PLMN1 (e.g., Reg1). The Reg1 may be used when the wireless device/UE 102 may request PDU(s) not across the PLMN2 (e.g., legacy operation in PLMN1).

Furthermore, in some instances, the SIM1 of the wireless device may register as home-routed roaming for PLMN2 via PLMN1 (e.g., Reg2). The Reg2 may be used when the wireless device may request one or more eMA-PDU sessions across PLMN1 and PLMN2. A similar approach may be possible for SIM2 of the wireless device/UE 102. SIM2 of the wireless device/UE 102 may be registered multiple times via PLMN1 and PLMN2 respectively based on home-routed roaming and non-roaming respectively.

In another example, a S-NSSAI may be setup where the S-NSSAI may indicate a service of an eMA-PDU session. For example, PLMN1 and PLMN2 may have a service agreement that with the given S-NSSAI, PLMN1 provides home-routed roaming architecture/service for a PDU session of the S-NSSAI, and PLMN2 provides non-roaming architecture/service for the PDU session of the S-NSSAI.

In some instances, when SMF of the PLMN1 receives a eMA-PDU session establishment request with the S-NSSAI, the SMF of the PLMN1 may determine the eMA-PDU session is under home-routed roaming scenario. Thus, the SMF of the PLMN1 may forward the request to the SMF of the PLMN2 based on the service agreement.

Figure 10:
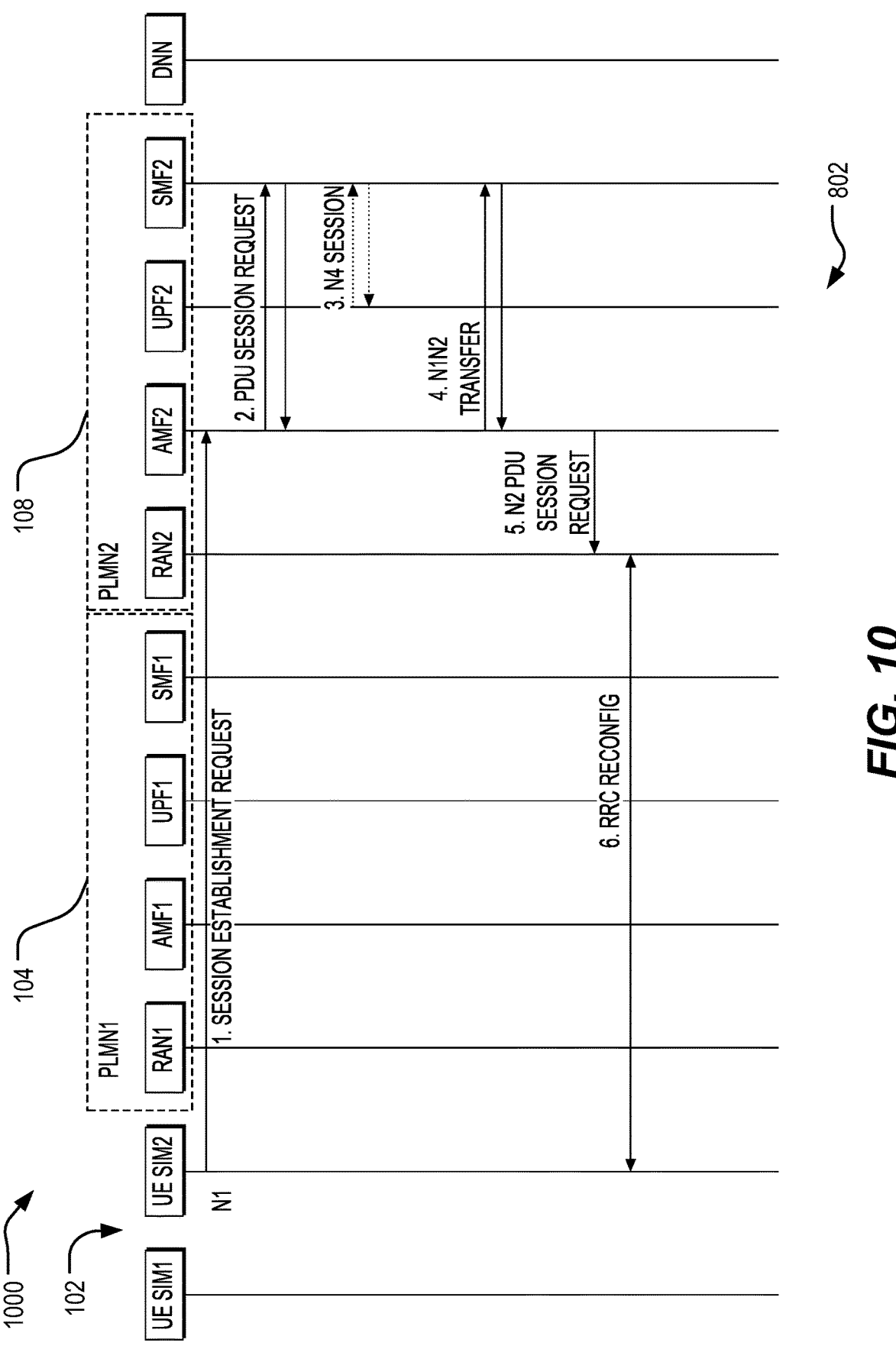
FIG. 10 illustrates an example system including a registration procedure for providing a multi-access PDU session, which can form at least a portion of the system depicted in FIG. 1.

FIG. 10 illustrates an example system 1000 including the fourth registration procedure 802 for providing a multi-access PDU session, which can form at least a portion of the system depicted in FIG. 1. FIG. 10 illustrates an example of the second eMA-PDU session establishment procedure of the second SIM of the UE 102, SIM2.

In some examples, The second eMA-PDU session establishment procedure may be based on non-roaming scenario or local breakout roaming scenario shown in TS 23.501 5.6 and/or TS 23.502 section 4.3.2.2.1. The first eMA-PDU session establishment procedure and the second eMA-PDU session establishment procedure may request a same PDU identifier. When the SMF2 of the PLMN2 receives the second eMA-PDU session establishment procedure, the SMF2 may identify/select a PCF (policy control function) of the PLMN2. The SMF2, in response to receiving the first eMA-PDU session establishment request forwarded by SMF1 via the first eMA-PDU session establishment request procedure, may use the PCF identified during the second eMA-PDU session establishment procedure. The second eMA-PDU session establishment procedure may occur before the first eMA-PDU session establishment. The SMF2 may select the same UPF between the first eMA-PDU session establishment and the second eMA-PDU session establishment.

In some instances, the wireless device/UE 102 may indicate whether the wireless device/UE 102 supports eMA-PDU session in addition to MA-PDU session. The wireless device/UE 102 supports eMA-PDU session may also support MA-PDU session. The wireless/UE 102 device may support eMA-PDU session over two 3GPP access networks. The wireless device/UE 102 may support eMA-PDU session over two 3GPP access networks and non-3GPP access network. The wireless device/UE 102 may support eMA-PDU session over two or more 3GPP access networks. The wireless device/UE 102 may support eMA-PDU session over two or more 3GPP access networks and/or one or more non-3GPP access networks Furthermore, in some instances, switching traffic of an MA PDU session between two non-3GPP access paths can be based on TR 23.700-53-040 ATSSS Rel-18. This solution can support at least one of the following principles (i)—(iv): (i) The path switching between non-3GPP accesses can be performed during the Registration procedure. The UE 102 can send a Registration Request via the target non-3GPP access network and requests user-plane establishment using the "PDU Sessions to be activated" parameter. A new registration type (e.g., Registration type=non-3GPP path switching) or a new indication can be used. (ii) The AMF can update the registration for non-3GPP access in UDM after the data traffic is switched to the new access. (iii) Path switching between any two non-3GPP accesses can be supported, (e.g., trusted to trusted, trusted to non-trusted, trusted to wireline, or any permutation) (iv) Capability exchange between UE and can be performed. This capability exchange can be performed at 5G Mobility Management (SGMM) signaling (Registration procedure) or 5G Session Management (5GSM) signaling (i.e., PDU Session establishment procedure) or both.

In some scenarios, when applied to cases of two non-3GPP access networks, the procedures discussed herein can occur without the loss of generality, wherein a first 3GPP access is replaced by a first non-3GPP access and a second 3GPP access is replaced by a second non-3GPP access. In case of two non-3GPP accesses, one non-3GPP access will be replaced by one 3GPP access. When there are more than two 3GPP access networks, the first eMA-PDU session establishment procedure may occur for each of non-anchor PLMN. Anchor PLMN may be determined as a PLMN has an anchor of UPF received data from DN.

In some examples, when the wireless device/UE 102 wants to request a new eMA-PDU session, if the UE 102 is registered to the same PLMN over first 3GPP and second 3GPP accesses, then the UE 102 shall send a PDU Session Establishment Request over any of the two accesses. The UE also provides Request Type as "eMA PDU Request" in the UL NAS Transport message. The AM F informs the SMF that the UE is registered over both accesses and this triggers the establishment of user-plane resources on both accesses and two N3/N9 tunnels between PSA and the RAN1/RAN2

Furthermore, when the wireless device/UE 102 wants to request a new eMA-PDU session, if the UE 102 is registered to different PLMNs over first 3GPP and second 3GPP accesses, then the UE shall send a PDU Session Establishment Request over one access that is anchored or home PLMN (e.g., where DN sends data to UPF of the anchor/home PLMN, where SMF is located whereas the SMF is registered for the eMA-PDU session in UDM). The UE 102 also provides Request Type as "eMA PDU Request" in the UL NAS Transport message. After this PDU Session is established with one N3/N9 tunnel between the PSA and (R)AN established, the UE shall send another PDU Session Establishment Request over the other access (e.g., non-anchor, non-home PLMN). The UE also provides the same PDU Session ID and Request Type as "MA PDU Request" in the UL NAS Transport message. Two N3/N9 tunnels and User-plane resources on both accesses are established.

Furthermore, when the wireless device/UE 102 wants to request a new eMA-PDU session, if the UE 102 is registered for two 3GPP accesses of different PLMNs and one non-3GPP access, MA-PDU session request of non-3GPP access may occur simultaneously if PLMN of non-3GPP access is same PLMN to one of PLMNs based on the first step. Otherwise, it may occur after establishment requests are done for two or more 3GPP accesses.

Furthermore, when the wireless device/UE 102 wants to request a new eMA-PDU session, if the UE is registered over one access only, then the UE shall send a PDU Session Establishment Request over this access. The UE also provides Request Type as "eMA PDU Request" in the UL NAS Transport message. One N3/N9 tunnel between the PSA and (R)AN and User-plane resources on this access only are established. After the UE is registered over the second access, the UE shall establish user-plane resources on the second access.

Furthermore, when the wireless device/UE 102 wants to request a new eMA-PDU session, in the PDU Session Establishment Request that is sent to request a new MA PDU Session, the UE 102 can provide also its ATSSS capabilities, which can indicate the steering functionalities and the steering modes supported in the UE 102. These functionalities can be defined in clause TS 23.501 5.32.6. The UE 102 can indicate whether it supports individual ATSSS rule updates.

Furthermore, when the wireless device/UE 102 wants to request a new eMA-PDU session, if the UE 102 requests an S-NSSAI, this S-NSSAI can be allowed on both accesses.

Furthermore, when the wireless device/UE 102 wants to request a new eMA-PDU session, the SMF can determine the ATSSS capabilities supported for the eMA PDU Session based on the ATSSS capabilities provided by the UE and per DNN configuration on SMF Additionally or alternatively, the PCC rules provided by PCF can include eMA PDU Session Control information (see TS 23.503 [45]). They can be used by SMF to derive ATSSS rules for the UE and N4 rules for the UPF. When dynamic PCC is not used for the eMA PDU Session, the SMF can provide ATSSS rules and N4 rules based on local configuration (e.g. based on DNN or S-NSSAI).

In some examples, the UE 102 can receive ATSSS rules from SMF, which indicate how the uplink traffic should be routed across 3GPP access and non-3GPP access. Similarly, the UPF can receive N4 rules from SMF, which indicate how the downlink traffic is routed across 3GPP access(es) and/or non-3GPP access. When the SMF receives a PDU Session Establishment Request and a "MA PDU Request" indication and determines that UP security protection is required for the PDU Session, the SMF can only confirm the establishment of the eMA PDU session if the 3GPP access network can enforce the required UP security protection. The SMF needs not confirm whether the non-3GPP access can enforce the required UP security protection in these situations.

In some instances, after the eMA PDU Session establishment, at any given time, the eMA PDU session may have user-plane resources on two 3GPP accesses and/or non-3GPP accesses, or on one access only, or may have no user-plane resources on any access.

In some instances, after the eMA PDU Session establishment, the AMF, SMF, PCF and UPF maintain their eMA PDU Session contexts, even when the UE 102 deregisters from one access (but remains registered on the other access).

In some instances, after the eMA PDU Session establishment, when the UE 102 deregisters from one access (but remains registered on the other access), the AMF can inform the SMF to release the resource of this access type in the UPF (e.g., UPF of the PLMN2, UPF of home PLMN, UPF of anchor PLMN) for the eMA PDU Session. Subsequently, the SMF can notify the UPF that the access type has become unavailable and the N3/N9 tunnel for the access type are released.

In some instances, after the eMA PDU Session establishment, if the UE 102 wants to add user-plane resources on one access of the eMA PDU Session, e.g. based on access network performance measurement and/or ATSSS rules, then the UE 102 can send a PDU Session Establishment Request over this access containing PDU Session ID of the eMA PDU Session. The UE 102 can also provide Request Type as "eMA PDU Request" and the same PDU Session ID in the UL NAS Transport message. If there is no N3/N9 tunnel for this access, the N3/N9 tunnel for this access can be established.

In some instances, after the eMA PDU Session establishment, if the UE 102 wants to re-activate user-plane resources on one access of the eMA PDU Session, e.g. based on access network performance measurement and/or ATSSS rules, then the UE 102 can initiate the UE Triggered Service Request procedure over this access.

In some instances, after the eMA PDU Session establishment, if the network wants to re-activate the user-plane resources over one or more 3GPP accesses or non-3GPP access of the MA PDU Session, the network can initiate the Network Triggered Service Request procedure, as specified in clause 4.22.7 of TS 23.502.

Furthermore, in some examples, an eMA PDU Session may be established either: when it is explicitly requested by an ATSSS-capable and/or eMA PDU capable UE; or when an ATSSS-capable and/or eMA PDU capable UE 102 requests a single-access PDU Session but the network decides to establish an eMA PDU Session instead. This may occur when the UE 102 requests a single-access PDU Session but no policy (e.g. no URSP rule) and no local restrictions in the UE mandate a single access for the PDU Session.

Figure 11:
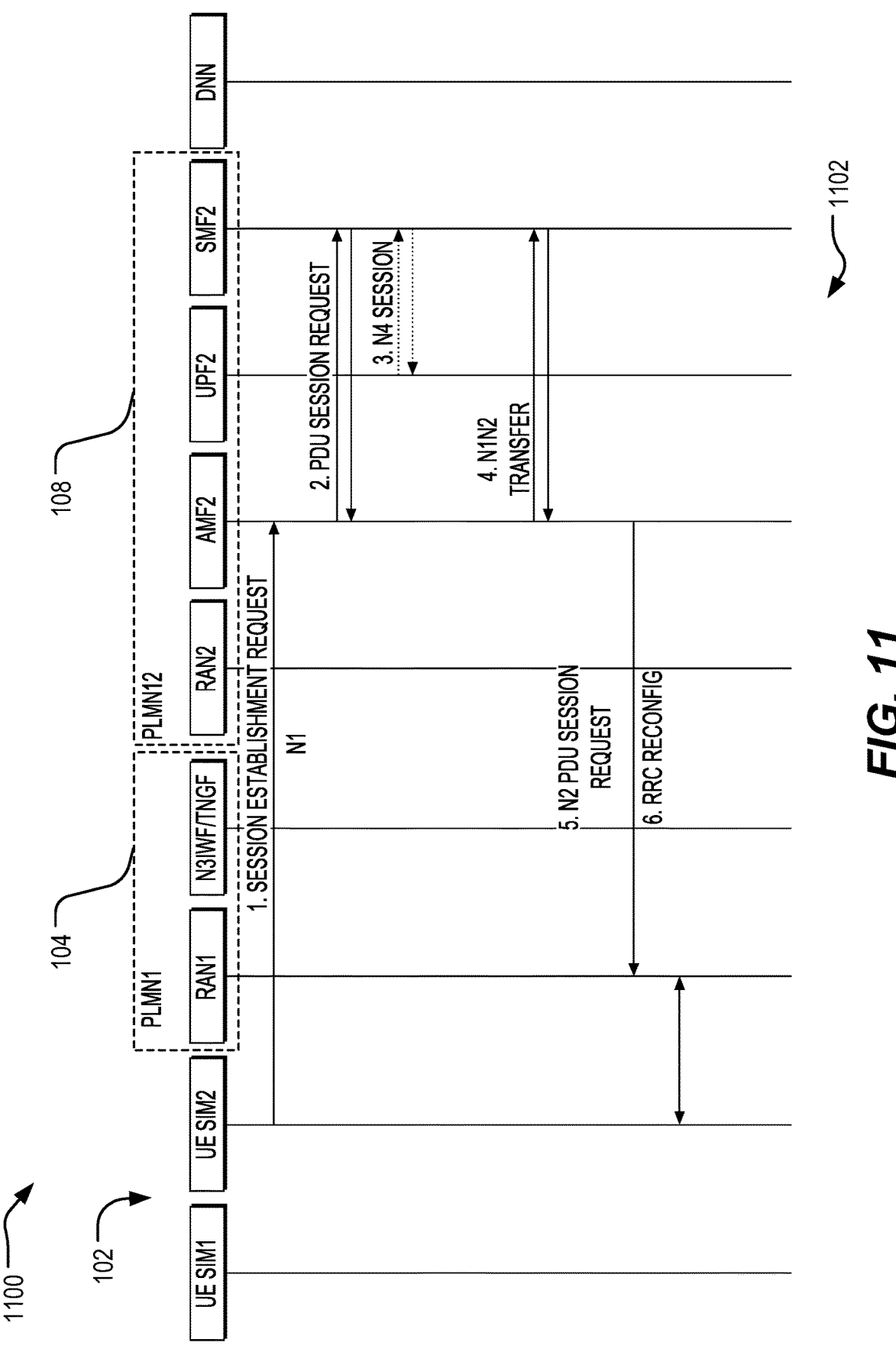
FIG. 11 illustrates an example system including a registration procedure for providing a multi-access PDU session, which can form at least a portion of the system depicted in FIG. 1.

FIG. 11 illustrates an example system including a fifth registration procedure 1102 for providing a multi-access PDU session, which can form at least a portion of the system depicted in FIG. 1. As noted above, the fifth registration procedure 1102 can include the base station 302 of PLMN1 communicating within the PLMN1 core network. PLMN1 core network can have N3IWF or N3IWF equivalent that interfaces (e.g., TNGF) between RAN of PLMN1 and core network of PLMN2. In some instances, the RAN1 of PLMN1 may be connected to a N3IWF interface that connects to core network of the PLMN2. From the PLMN2 perspective, RAN1 of PLM N1 may be considered as non-3GPP network. The ATSSS of MA-PDU may support MA-PDU session via RAN2 as 3GPP access and via RAN1 as non-3GPP access.

Figure 12:
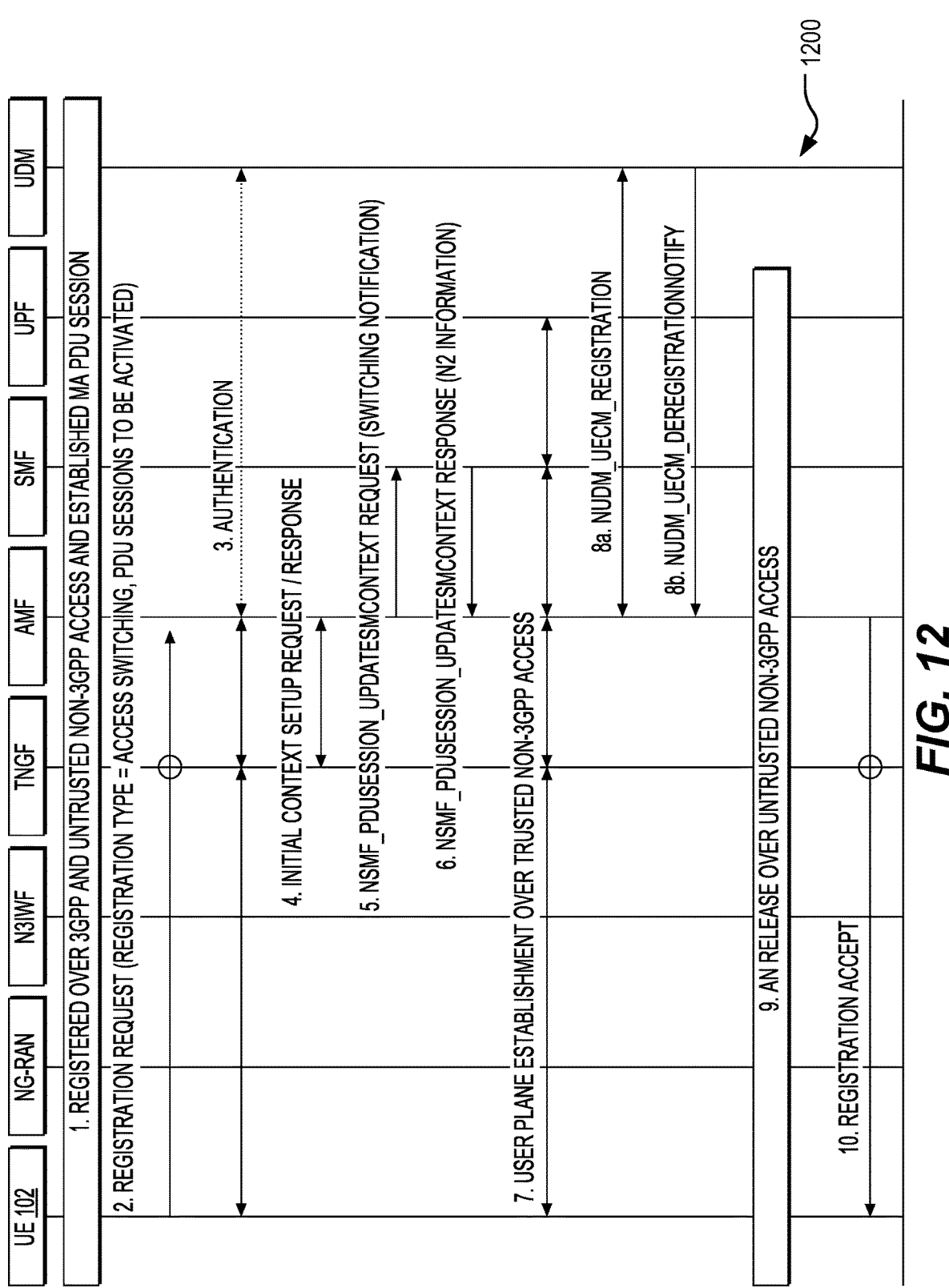
FIG. 12 illustrates an example method for implementing a multi-access PDU session, which can be performed by the system depicted in FIG. 1.

FIG. 12 illustrates an example system 1200 including at least one of the registration procedures for providing a multi-access PDU session discussed herein, which can form at least a portion of the system depicted in FIG. 1. The techniques depicted in FIG. 12 can relate to overall non-3GPP access switching procedures. In some examples, the techniques discussed herein can use operations defined by, be implemented into, and/or otherwise relate to Reference TR23.700-53-040.

For instance, the solutions discussed herein can address Key Issue #5 "Switching traffic of an MA PDU Session between two non-3GPP access paths" by allowing two simultaneous registrations over two non-3GPP accesses. In this solution, in order to minimize overall system impact, the AMF can delay UDM Registration until access switching is completed.

In some instances, as a high-level description, when the UE 102 establishes MA PDU Session, the SMF may indicate to the UE 102 whether non-3GPP access switching is supported. Based on this indication, the UE 102 may determine to change non-3GPP access leg. Whether and when to switch non-3GPP access can be determined by the UE 102. If the UE 102 determines to switch access, the UE 102 can perform registration over the new non-3GPP access with a new registration type to indicate the registration is for switching non-3GPP access.

In some examples, the AMF can follow registration procedure as described in TS 23.502 [3] but can omit performing UDM registration. After the Registration procedure is completed, the UE 102 can send PDU Session Establishment message to add a new non-3GPP access leg to the existing MA PDU Session. After the access leg over the new non-3GPP access is established, the UE 102 and UPF can start sending traffic over the new non-3GPP access leg and stops sending traffic over the old non-3GPP access leg. The AMF can trigger AN release procedure over the old non-3GPP access and performs UDM Registration.

Additionally procedures based on the UE 102 being registered over untrusted non-3GPP access first and then switches trusted non-3GPP access are discussed below (e.g., (1)— (9) below).

For instance, (1) the UE 102 can be registered over 3GPP access and untrusted non-3GPP access and established MA PDU Session. During the MA PDU Session Establishment, the UE 102 can indicate whether it supports non-3GPP access switching in the PDU Session Establishment Request message. The AMF can also indicate whether it supports non-3GPP access switching to the SMF. Considering the received capabilities of the UE 102, AMF and SMF capability, the SMF can indicate whether non-3GPP access switching is supported to the UE 102 in the PDU Session Establishment Accept message.

In some examples, (2) the UE 102 registers over trusted non-3GPP access with new Registration type=non-3GPP access switching. The UE 102 can include in the List Of PDU Sessions To Be Activated the MA PDU Sessions that user plane resources are established over untrusted non-3GPP access. It can be ensured by the UE, that the selected trusted Non-3GPP Gateway Function (TNGF) supports the S-NSSAI of the established MA PDU Session (or this can be done by the network). In case the AMF needs to redirect the UE 102 to the other TNGF, the AMF does not trigger non-3GPP access switching and can wait until a redirection procedure is finished (e.g. may be done between step 3 and step 4 below, or the UE 102 may trigger registration with the new TNGF and then perform non-3GPP access switching solutions).

In some examples, (3) the AMF may perform authentication procedure based on existing procedure. Then (4) the AMF can send Initial UE Context Setup Request message to the TNGF. After the Initial UE Context Setup procedure is completed, (5) the AMF can notify to the SMF that the UE requested non-3GPP access switching.

Additionally (6 and 7) the SMF can establish user plane resources over the trusted non-3GPP access. At this point, there can be three user plane tunnels (i.e. 3GPP access, untrusted non-3GPP access, trusted non-3GPP access) in the UE 102 and UPF. When the SMF establishes user plane resources over the trusted non-3GPP access, the SMF can set the target access type to "trusted non-3GPP access" so that the AMF delivers the N2 information to the trusted non-3GPP access. Moreover, (8) the AMF can perform UDM Registration by triggering Nudm_UECM_Registration service operation. After this point, all signaling and Reachability procedures can be performed over the trusted non-3GPP access.

Moreover, (9) the AMF can perform AN release procedure over the untrusted non-3GPP access. As a result of this procedure, user plane resources over untrusted non-3GPP access of MA PDU can be completely released. When the UE 102 and UPF recognize that user plane resources over untrusted non-3GPP access are released, the UE 102 and the UPF can start to send traffic over trusted non-3GPP access. Additionally (10) the AMF can send a Registration Accept message to the UE 102. When the UE 102 receives Registration Accept message, the UE 102 can consider that the UE 102 is deregistered from untrusted non-3GPP access and registered over trusted non-3GPP access.

In some instances, the techniques discussed herein can have various impacts on Existing Nodes and Functionality. For instance, regarding the UE 102, the UE 102 can perform Registration with a new registration type; indicate to the SMF that the UE supports non-3GPP access switching during the MA PDU Session Establishment; temporarily maintain simultaneous parallel user plane tunnel over untrusted 3GPP access and trusted non-3GPP access; and/or when the UE 102 receives the Registration Accept message for the target non-3GPP access, the UE considers that it is deregistered from the source non-3GPP access. In some scenarios, regarding the AMF, during the Registration procedure, the AMF can delay UDM registration until non-3GPP access switching is completed. Furthermore, the AMF can indicate to the SMF that the AMF supports non-3GPP access switching during the MA PDU Session Establishment. The AMF can also notify the SMF that the UE 102 requested non-3GPP access switching during the Registration procedure. Additionally, the AMF can perform AN release over old access during the Registration procedure. In some scenarios, the SMF can indicate to the UE 102 whether the MA PDU Session supports non-3GPP access switching during the MA PDU Session Establishment. Additionally or alternatively, the UPF can temporarily maintain simultaneous parallel user plane tunnels over untrusted 3GPP access and trusted non-3GPP access.

It is to be understood that the specific order or hierarchy of steps in the method(s) discussed and/or depicted throughout this disclosure are instances of example approaches and can be rearranged while remaining within the disclosed subject matter. For instance, any of the operations discussed and/or depicted throughout this disclosure may be omitted, repeated, performed in parallel, performed in a different order, and/or combined with any other of the operations discussed and/or depicted and throughout this disclosure.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined differently in various implementations of the disclosure or described with different terminology. These and other variations, modifications, additions, and improvements may fall within the scope of the disclosure as defined in the claims that follow.

What is claimed is:

1. A method comprising:
sending by a wireless device to a network, one or more indications that:
the wireless device supports an enhanced multi-access protocol data unit (eMA-PDU) session comprising a first PDU session and a second PDU session, the first PDU session is established via a 3rd Generation Partnership Project (3GPP) access and the second PDU session is established via a first non-3GPP access; and
the wireless device supports eMA-PDU session comprising a third PDU session, wherein the third PDU session is established via a second non-3GPP access;
sending by the wireless device:
a first PDU session request of the eMA-PDU session, to the network via the 3GPP access; and
a second PDU session request of the eMA-PDU session, to the network, via the first non-3GPP access;
receiving a response indicating a successful second PDU session establishment based on a session management function (SMF) of the second PDU session forwarding the second PDU session request to a user plane function (UPF) of the first PDU session as an anchor network of the eMA-PDU session, the anchor network managing the eMA-PDU session, wherein the response is based on the establishment of the second PDU session by the UPF of the first PDU session related to the eMA-PDU session; and
communicating with the network based on the eMA-PDU session, wherein data communicated via the second PDU session from the wireless device is forwarded from a UPF of the second PDU session to the UPF of the first PDU session as the anchor network of the eMA-PDU session managed by the anchor network.

2. A method comprising:
sending, by a wireless device, a first protocol data unit (PDU) session establishment request to a first network, wherein the first PDU session establishment request indicates:

a PDU session type being an enhanced multi-access PDU (eMA-PDU) session across a plurality of access networks which includes a first access network and a second access network;
an anchor network of the eMA-PDU session being the first network; and
a PDU session identifier;
receiving, via the first access network, a first response indicating a successful first establishment of a first PDU session, the first access network being a new radio access network;
sending, by the wireless device and based on receiving the first response, a second PDU session establishment request to a second network indicating:
the PDU session type;
the anchor network of the eMA-PDU session being the first network; and
the PDU session identifier;
receiving, via the second access network, a second response indicating a successful second session establishment of a second PDU session, the second access network being a long-term evolution access network, wherein the second response indicating the successful second session establishment is based on a session management function (SMF) of the second network forwarding the second PDU session establishment request to an SMF of the first network as the anchor network of the eMA-PDU session, the anchor network managing the eMA-PDU session, and the SMF of the first network forwarding the second PDU session establishment to a user plane function (UPF) of the first network for establishment of the second PDU session, wherein the second response is based on the establishment of the second PDU session by the UPF of the first network; and
communicating with at least one of the first access network or the second access network based on the second PDU session, wherein data communicated to the long-term evolution access network of the second access network from the wireless device is forwarded from the UPF of the second network to the UPF of the new radio access network of the first network as the anchor network of the eMA-PDU session managed by the anchor network.

3. The method of claim 2, wherein the first PDU session establishment request is received by a session management function (SMF) of the first network.

4. The method of claim 2, wherein indicating the anchor network being the first network includes indicating a network access identifier associated with the first network.

5. The method of claim 2, wherein indicating the anchor network being the first network includes indicating a public key infrastructure (PKI) associated with the first network.

6. The method of claim 2, further comprising indicating the anchor network being the first network by indicating a public land and mobile network (PLMN) identifier of the first network.

7. The method of claim 2, further comprising indicating the anchor network being the first network by indicating the PDU session identifier that is registered with the session management function (SMF) of the first network.

8. The method of claim 2, further comprising indicating the anchor network being the first network by indicating the PDU session type to the first network based on the first network being equipped with an access traffic steering, switching and splitting (ATSSS) of the eMA-PDU session across the plurality of access networks.

9. The method of claim 2, further comprising indicating the anchor network being the first network by indicating a single network slice selection assistance information (S-NS-SAI) that supports the first PDU session across the plurality of access networks with the anchor network being the first network.

10. The method of claim 2, wherein the first network is a 5G core network and the second network is a 5G core network or a 4G core network.

11. The method of claim 2, wherein the wireless device is equipped with a plurality of identity credentials corresponding to at least a first identity and a second identity.

12. The method of claim 11, wherein the first identity is a first Subscriber Identity Module (SIM).

13. The method of claim 12, wherein the second identity is a second SIM.

14. The method of claim 11, further comprising the wireless device sending a second registration request via the second identity to the second network.

15. The method of claim 2, wherein first PDU session establishment request indicates whether the wireless device supports non-3GPP access.

16. The method of claim 2, wherein the anchor network includes the session management function (SMF) or an S-Gateway and the user plane function (UPF).

17. A method comprising:
    receiving, by a first session management function (SMF) of a first network, a protocol data unit (PDU) session establishment request from a wireless device, wherein the PDU session establishment request indicates:
        a PDU session type being an enhanced multi-access (eMA-PDU) session across a plurality of access networks comprising a first access network of the first network and a second access network of a second network;
        an anchor network being the second network; and
        a PDU session identifier;

determining a second SMF of the second network in response to the anchor network being the second network, the anchor network managing the eMA-PDU session;
    sending a forwarded request of the PDU session establishment request to the second SMF of the second network to establish a second of the eMA-PDU session, the SMF of the first network forwarding the PDU session establishment to a user plane function (UPF) of the first network for establishment of the eMA-PDU session;
    receiving a response of the forwarded request of the PDU session establishment request from the second SMF, wherein the response is based on the establishment of the eMA-PDU session by the UPF of the first network; and
    transmitting, at least partly based on the response, a forwarded response of the PDU session establishment to the wireless device.

18. The method of claim 17, wherein indicating the anchor network being the second network includes indicating the PDU session identifier registered with the SMF of the second network.

19. The method of claim 17, wherein indicating the anchor network being the second network includes indicating the PDU session type to the second network that is equipped with an access traffic steering, switching and splitting (ATSSS) of the multi-access PDU session across the plurality of access networks.

20. The method of claim 17, wherein indicating the anchor network being the second network includes indicating a single network slice selection assistance information (S-NSSAI) that supports a PDU session across the plurality of access networks with the anchor network being the second network.

\* \* \* \* \*